United States Patent
Fang et al.

(10) Patent No.: US 11,687,193 B2
(45) Date of Patent: *Jun. 27, 2023

(54) DISPLAY SUBSTRATE AND DISPLAY DEVICE

(71) Applicants: Hefei BOE Optoelectronics Technology Co., Ltd., Anhui (CN); BOE Technology Group Co., Ltd., Beijing (CN)

(72) Inventors: Zhixiang Fang, Beijing (CN); Liangliang Zheng, Beijing (CN); Guanglei Yang, Beijing (CN); Xuxu Hu, Beijing (CN); Peng Ding, Beijing (CN); Meng Wang, Beijing (CN)

(73) Assignees: Hefei BOE Optoelectronics Technology Co., Ltd., Hefei (CN); BOE Technology Group Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/670,600

(22) Filed: Feb. 14, 2022

(65) Prior Publication Data

US 2022/0164103 A1    May 26, 2022

Related U.S. Application Data

(63) Continuation-in-part of application No. 16/903,531, filed on Jun. 17, 2020, now Pat. No. 11,269,451.

(30) Foreign Application Priority Data

Dec. 18, 2019  (CN) .......................... 201911309011.7
Jan. 26, 2022  (CN) .......................... 202220204847.1

(51) Int. Cl.
    *G06F 3/041*    (2006.01)

(52) U.S. Cl.
    CPC ...... *G06F 3/041661* (2019.05); *G06F 3/0412* (2013.01)

(58) Field of Classification Search
    CPC ........ G06F 3/044; G06F 3/0412; G06F 3/041; G06F 3/0416; G06F 3/0446;
    (Continued)

(56) References Cited

U.S. PATENT DOCUMENTS 5,495,077 A    2/1996  Miller et al.
9,223,425 B1 * 12/2015  Kim ................... G06F 3/04166
(Continued)

OTHER PUBLICATIONS

Office Action from U.S. Appl. No. 16/903,531 dated Apr. 27, 2021.

*Primary Examiner* — Olga V Merkoulova
(74) *Attorney, Agent, or Firm* — ArentFox Schiff LLP; Michael Fainberg

(57) ABSTRACT

The present disclosure provides a display substrate and a display device, including a display area and a non-display area on at least one side of the display area; and a plurality of touch signal lines in the display area as well as a plurality of groups of touch selection circuits, a plurality of groups of load compensation circuits and a plurality of touch pads in the non-display area. The load compensation circuits are connected with the touch selection circuits, one group of touch selection circuits is electrically connected with one touch pad and at least two touch signal lines, and one group of load compensation circuits and one group of touch selection circuits connected with each other are electrically connected with one same touch signal line, and are arranged side by side in a vertical direction of the touch signal line.

23 Claims, 32 Drawing Sheets

(58) Field of Classification Search
CPC ............... G06F 3/04164; G06F 3/0443; G06F 2203/04103; G06F 3/0445; G06F 2203/04111; G06F 2203/04102; G06F 2203/04105; G09F 9/30
See application file for complete search history.

(56) References Cited

U.S. PATENT DOCUMENTS

| | | | |
|---|---|---|---|
| 9,268,448 B2* | 2/2016 | Chang | G06F 3/04184 |
| 10,453,379 B2 | 10/2019 | Nitobe | |
| 10,910,592 B2* | 2/2021 | Kuon | H01L 51/5281 |
| 11,269,451 B2* | 3/2022 | Fang | G06F 3/04164 |
| 2006/0187142 A1 | 8/2006 | Lesniak | |
| 2009/0314621 A1 | 12/2009 | Hotelling | |
| 2010/0134429 A1 | 6/2010 | You et al. | |
| 2010/0253638 A1 | 10/2010 | Yousefpor et al. | |
| 2011/0061949 A1 | 3/2011 | Krah et al. | |
| 2011/0261005 A1 | 10/2011 | Joharapurkar et al. | |
| 2013/0069905 A1 | 3/2013 | Krah et al. | |
| 2013/0335376 A1 | 12/2013 | Lee | |
| 2014/0015788 A1* | 1/2014 | Chang | G06F 3/04182 345/173 |
| 2014/0043284 A1 | 2/2014 | Park et al. | |
| 2015/0116261 A1 | 4/2015 | Ahn | |
| 2016/0070394 A1* | 3/2016 | Van Ostrand | G06F 3/047 345/173 |
| 2016/0116997 A1 | 4/2016 | Kim et al. | |
| 2016/0170529 A1* | 6/2016 | Lee | G06F 3/044 345/174 |
| 2017/0090673 A1* | 3/2017 | Kim | G06F 3/0418 |
| 2018/0088735 A1* | 3/2018 | Lin | G06F 3/044 |
| 2018/0218665 A1 | 8/2018 | Nitobe | |
| 2019/0064977 A1* | 2/2019 | Feng | G06F 3/0412 |
| 2019/0198801 A1* | 6/2019 | Kuon | H01L 51/5246 |
| 2020/0210041 A1* | 7/2020 | Liu | G06F 3/04164 |

* cited by examiner

DISPLAY SUBSTRATE AND DISPLAY DEVICE

CROSS REFERENCE TO RELATED APPLICATIONS

This application is a continuation-in-part of U.S. patent application Ser. No. 16/903,531, filed on Jun. 17, 2020, which claims priority to Chinese Patent Application No. 201911309011.7, filed to on Dec. 18, 2019, and Chinese Patent Application No. 202220204847.1, filed to on Jan. 26, 2022, all which are hereby incorporated by reference in their entireties.

FIELD

The present disclosure relates to the field of display technologies, in particular to a display substrate and a display device.

BACKGROUND

With the rapid development of display technologies, touch display devices have been widely used. Generally, a touch function and a display function in a touch display device are independently controlled by two chips. In order to improve the degree of integration of the touch display device, a touch and display driver integration (TDDI) chip comes into being. The TDDI chip integrates the functions of a touch chip and a display chip into an integrated chip (IC).

SUMMARY

Embodiments of the present disclosure provide a display substrate and a display device.

An embodiment of the present disclosure provides a display substrate, including: a base substrate, including a display area and a non-display area on at least one side of the display area; a plurality of touch signal lines in the display area; and a touch signal multiplexer, a compensator and a plurality of touch pads in the non-display area; wherein the touch signal multiplexer includes a plurality of groups of touch selection circuits, the compensator includes a plurality of groups of load compensation circuits, and the plurality of groups of load compensation circuits are connected with the plurality of groups of touch selection circuits respectively; at least one group of touch selection circuits includes one touch input and at least two touch outputs, the one touch input is electrically connected with one touch pad, and one of the at least two touch outputs is electrically connected with at least one of the touch signal lines; and one group of load compensation circuits and one group of touch selection circuits connected with each other are electrically connected with same touch signal lines, and are arranged side by side in a first direction perpendicular to a second direction in which the touch signal lines extend.

In some embodiments, the display substrate provided by the embodiment of the present disclosure further includes at least two first control signal lines in the non-display area; wherein each group of touch selection circuits includes: at least two groups of first switching transistors, one group of first switching transistors is electrically connected with at least one of the touch signal lines, gates of the respective groups of first switching transistors are electrically connected with the respective first control signal lines, first terminals of the respective groups of first switching transistors are electrically connected with the respective touch signal lines, and second terminals of all the groups of first switching transistors are electrically connected with one same touch pad.

In some embodiments, the display substrate provided by the embodiment of the present disclosure further includes at least two second control signal lines and a compensation signal line in the non-display area; wherein each of the load compensation circuits includes: at least two groups of second switching transistors, one group of second switching transistors is electrically connected with at least one of the touch signal lines, gates of the respective groups of second switching transistors are electrically connected with the respective second control signal lines, first terminals of the respective groups of second switching transistors are electrically connected with the respective touch signal lines, and second terminals of all the groups of second switching transistors are electrically connected with the compensation signal line.

In some embodiments, in the display substrate provided by the embodiment of the present disclosure, the first switching transistor and the second switching transistor electrically connected with one same touch signal line are configured that, within a same time duration, in a condition that the first switching transistor is turned on, the second switching transistor is turned off, and in a condition that the first switching transistor is turned off, the second switching transistor is turned on.

In some embodiments, in the display substrate provided by the embodiment of the present disclosure, the second terminals of all the second switching transistors are electrically connected with one same compensation signal line.

In some embodiments, in the display substrate provided by the embodiment of the present disclosure, the at least two first control signal lines, the at least two second control signal lines and the compensation signal line all extend in the first direction; and the at least two first control signal lines, the at least two second control signal lines and the compensation signal line are between the plurality of groups of touch selection circuits and the plurality of touch pads; or the at least two first control signal lines, the at least two second control signal lines and the compensation signal line are between the plurality of groups of touch selection circuits and the display area.

In some embodiments, in the display substrate provided by the embodiment of the present disclosure, the at least two second control signal lines are between the at least two first control signal lines and the compensation signal line, and the compensation signal line is adjacent to the plurality of groups of touch selection circuits.

In some embodiments, in the display substrate provided by the embodiment of the present disclosure, the at least two first control signal lines, the at least two second control signal lines and the compensation signal line all extend in the first directions; and the at least two first control signal lines are on a side, along the first directions, of the plurality of groups of touch selection circuits, and the at least two second control signal lines and the compensation signal line are on other side, along the first directions, of the plurality of groups of touch selection circuits.

In some embodiments, the display substrate provided by the embodiment of the present disclosure further includes at least two third control signal lines in the non-display area; wherein each group of touch selection circuits further includes: at least two groups of third switching transistors, and gates of the respective groups of third switching transistors are electrically connected with the respective third control signal lines; and the respective groups of third switching transistors and the respective groups of first switching transistors are arranged in one-to-one correspondence, first terminals of the third switching transistors are electrically connected with the second terminals of the corresponding first switching transistors, and second terminals of the third switching transistors are electrically connected with the first terminals of the corresponding first switching transistors.

In some embodiments, in the display substrate provided by the embodiment of the present disclosure, one group of third switching transistors and the corresponding group of first switching transistors are sequentially arranged in the second direction.

In some embodiments, the display substrate provided by the embodiment of the present disclosure further includes at least two fourth control signal lines in the non-display area; wherein each group of load compensation circuits further includes: at least two groups of fourth switching transistors, and gates of the respective groups of fourth switching transistors are electrically connected with the respective fourth control signal lines; and all the groups of fourth switching transistors and all the groups of second switching transistors are arranged in one-to-one correspondence, first terminals of the fourth switching transistors are electrically connected with the second terminals of the corresponding second switching transistors, and second terminals of the fourth switching transistors are electrically connected with the first terminals of the corresponding second switching transistors.

In some embodiments, in the display substrate provided by the embodiment of the present disclosure, one group of fourth switching transistors and the corresponding group of second switching transistors are sequentially arranged in the second direction.

In some embodiments, in the display substrate provided by the embodiment of the present disclosure, in the first directions, the first switching transistors and the second switching transistors are arranged side by side, and the third switching transistors and the fourth switching transistors are arranged side by side.

In some embodiments, in the display substrate provided by the embodiment of the present disclosure, the first switching transistors and the second switching transistors are N type transistors, and the third switching transistors and the fourth switching transistors are P type transistors; or the first switching transistors and the second switching transistors are P type transistors, and the third switching transistors and the fourth switching transistors are N type transistors.

In some embodiments, in the display substrate provided by the embodiment of the present disclosure, each of one group of first switching transistors, one group of second switching transistors, one group of third switching transistors and one group of fourth switching transistors only includes one switching transistor, or includes at least two switching transistors in parallel.

In some embodiments, in the display substrate provided by the embodiment of the present disclosure, the at least two first control signal lines, the at least two second control signal lines, the at least two third control signal lines, the at least two fourth control signal lines and the compensation signal line all extend in the first directions; the at least two first control signal lines, the at least two second control signal lines and the compensation signal line are on a side, along the first directions, of the plurality of groups of touch selection circuits; and the at least two third control signal lines and the at least two fourth control signal lines are on the other side, along the first directions, of the plurality of groups of touch selection circuits.

In some embodiments, the display substrate provided by the embodiment of the present disclosure further includes a plurality of touch electrodes in the display area, wherein the plurality of touch electrodes are electrically connected with the plurality of touch signal lines; and touch electrodes electrically connected with each group of touch selection circuits through the touch signal lines are in a same row or a same column.

In some embodiments, the display substrate provided by the embodiment of the present disclosure further includes a plurality of common electrode blocks in the display area, wherein the common electrode blocks are multiplexed as the touch electrodes.

In some embodiments, the display substrate provided by the embodiment of the present disclosure further includes a plurality of data signal lines in the display area, and a plurality of groups of data selection circuits and a plurality of data pads in the non-display area; wherein a third direction in which the data signal lines extend is parallel to the second direction; and each group of data selection circuits includes one data input and at least two data outputs, the one data input is electrically connected with one data pad, and one of the at least two data outputs is electrically connected with at least one of the data signal lines.

In some embodiments, the display substrate provided by the embodiment of the present disclosure further includes at least two fifth control signal lines in the non-display area; wherein each group of data selection circuits includes: at least two groups of fifth switching transistors, one group of fifth switching transistors is electrically connected with at least one of the data signal lines, gates of the respective groups of fifth switching transistors are electrically connected with the respective fifth control signal lines, first terminals of the respective groups of fifth switching transistors are electrically connected with the respective data signal lines, and second terminals of all the groups of fifth switching transistors are electrically connected with one same data pad.

In some embodiments, in the display substrate provided by the embodiment of the present disclosure, one group of fifth switching transistors only includes one fifth switching transistor, or includes at least two fifth switching transistors in parallel.

In some embodiments, in the display substrate provided by the embodiment of the present disclosure, the at least two fifth control signal lines extend in the first directions, and the at least two fifth control signal lines are between the plurality of groups of data selection circuits and the plurality of groups of touch selection circuits.

In some embodiments, the display substrate provided by the embodiment of the present disclosure further includes a plurality of connection lines in the non-display area, wherein the data input is electrically connected with the corresponding data pad through one of the plurality of connection lines.

In some embodiments, in the display substrate provided by the embodiment of the present disclosure, in the load compensation circuits and the touch selection circuits connected with each other, the touch selection circuits include internal gaps, and the load compensation circuits are on two sides, along the second direction, of the touch selection circuits; and every three of the connection lines are one group, and one group of connection lines penetrates through one of the internal gaps.

In some embodiments, the display substrate provided by the embodiment of the present disclosure further includes a first driving chip and a second driving chip in the non-display area, wherein a first part of the touch pads serially arranged in the first directions are electrically connected with the first driving chip, a second part of the touch pads serially arranged in the first directions are electrically connected with the second driving chip, a first part of the data pads serially arranged in the first directions are electrically connected with the first driving chip, and a second part of the data pads serially arranged in the first directions are electrically connected with the second driving chip.

Based on the same inventive concept, an embodiment of the present disclosure further provides a display device, including the display substrate provided by the embodiment of the present disclosure.

DETAILED DESCRIPTION OF THE EMBODIMENTS

In order to make the objects, the technical solutions and the advantages of the present disclosure clearer, the specific implementations of a display substrate and a display device provided by embodiments of the present disclosure will be described in detail below in conjunction with the drawings. It should be understood that the preferred embodiments described below are only used to illustrate and explain the present disclosure, and are not used to limit the present disclosure. Furthermore, in the case of no conflict, the embodiments in the present disclosure and the features in the embodiments can be combined mutually.

Figure 1:
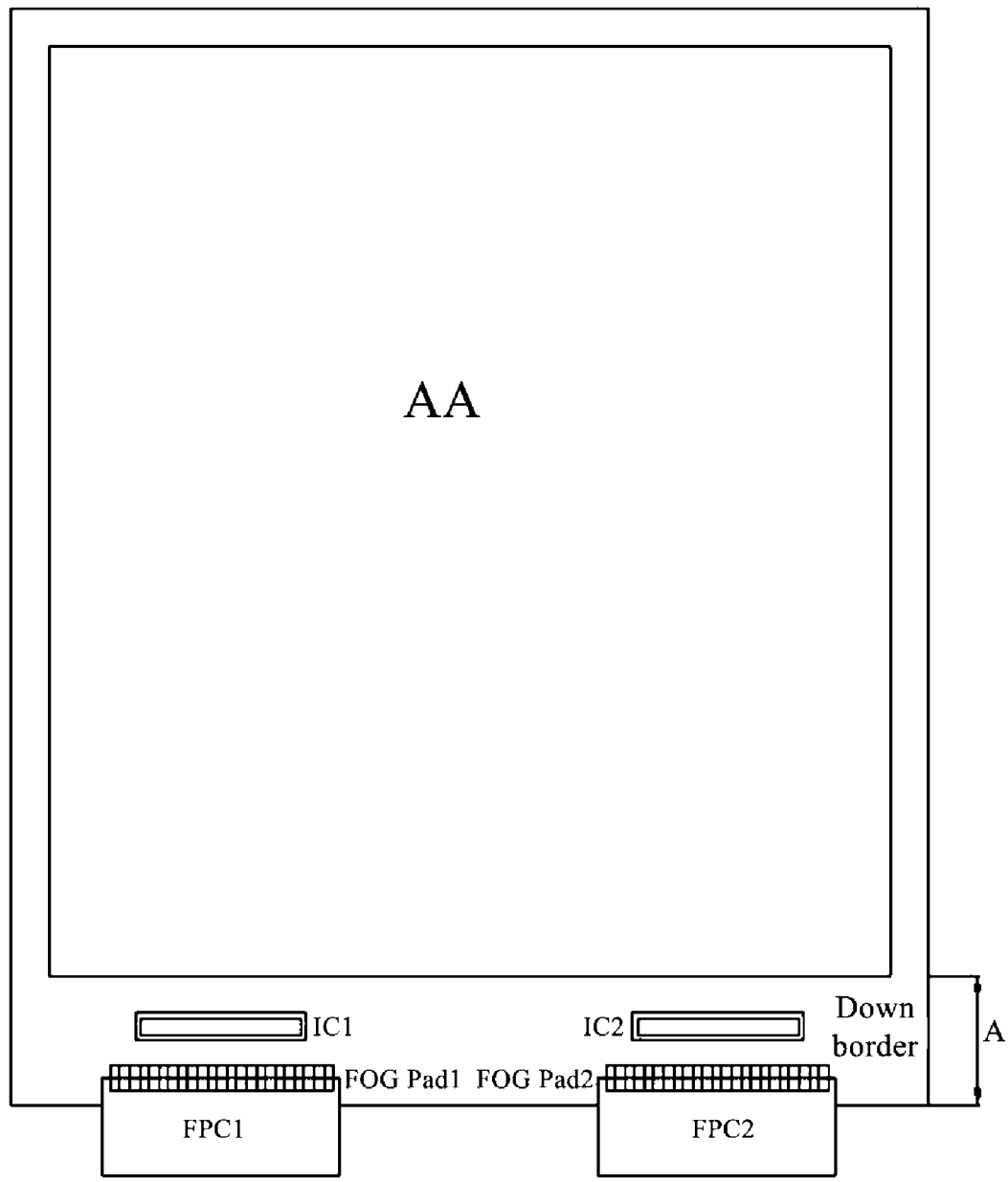
FIG. 1 is a top schematic diagram of the structure of a touch screen provided in the related art.
Figure 2:
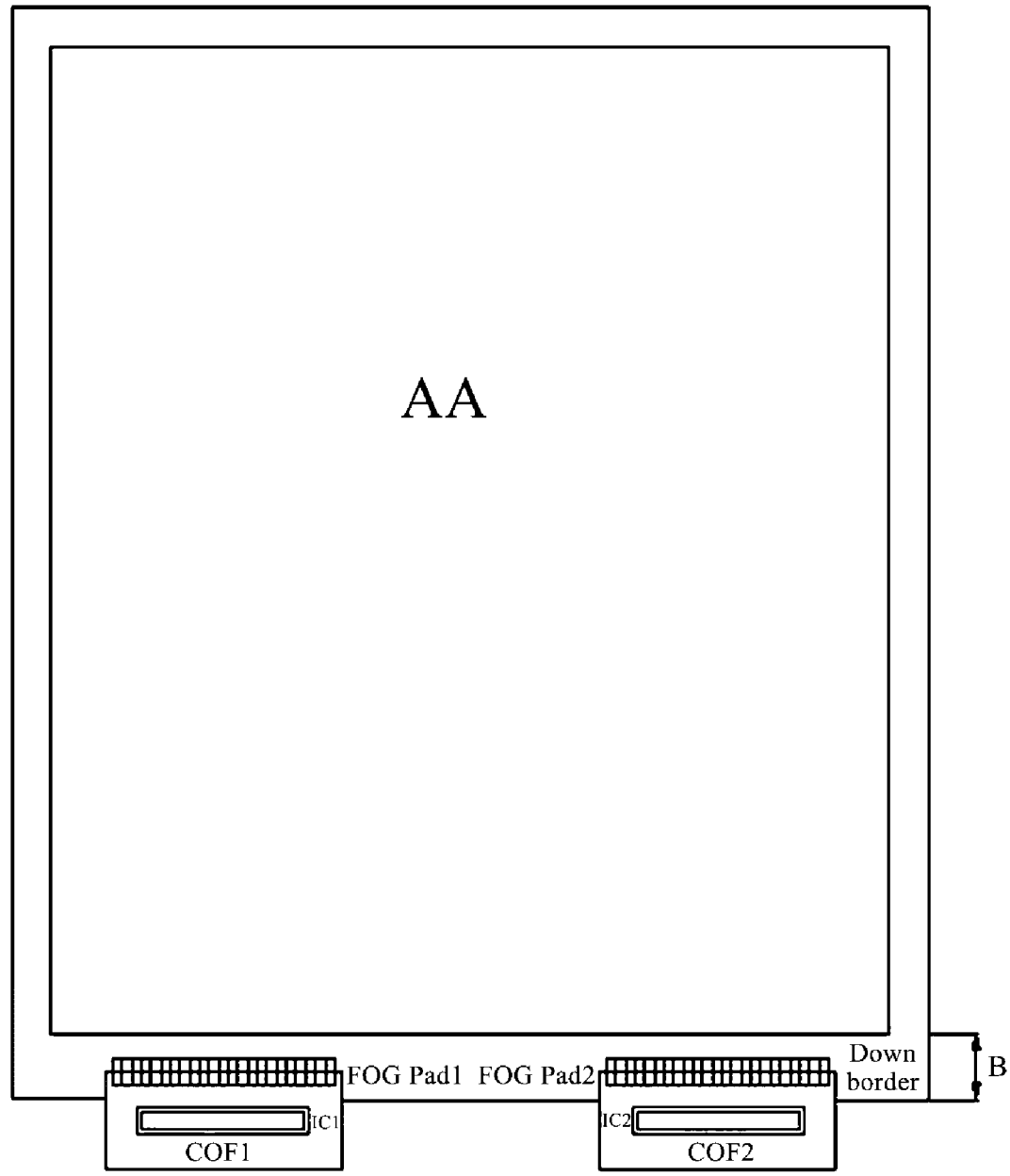
FIG. 2 is a top schematic diagram of the structure of another touch screen provided in the related art.
Figure 3:
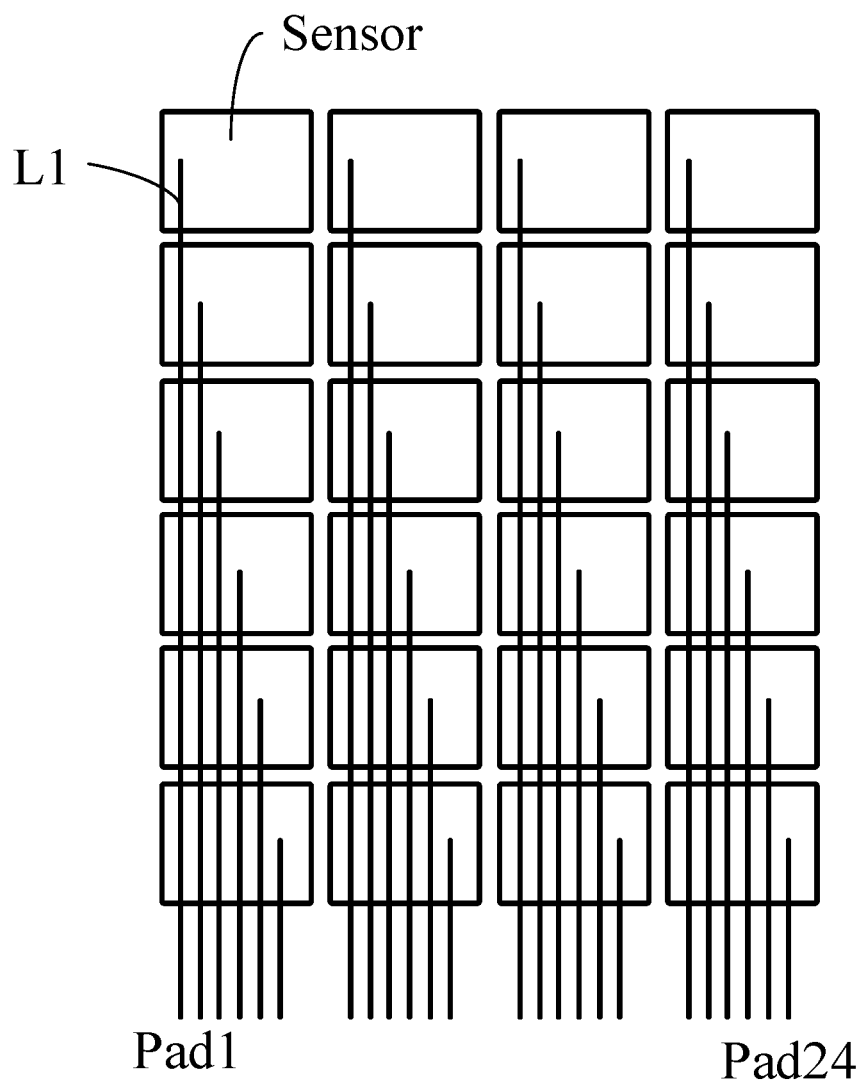
FIG. 3 is a schematic diagram illustrating the corresponding relationship between touch signal lines and pads provided in the related art.
Figure 4:
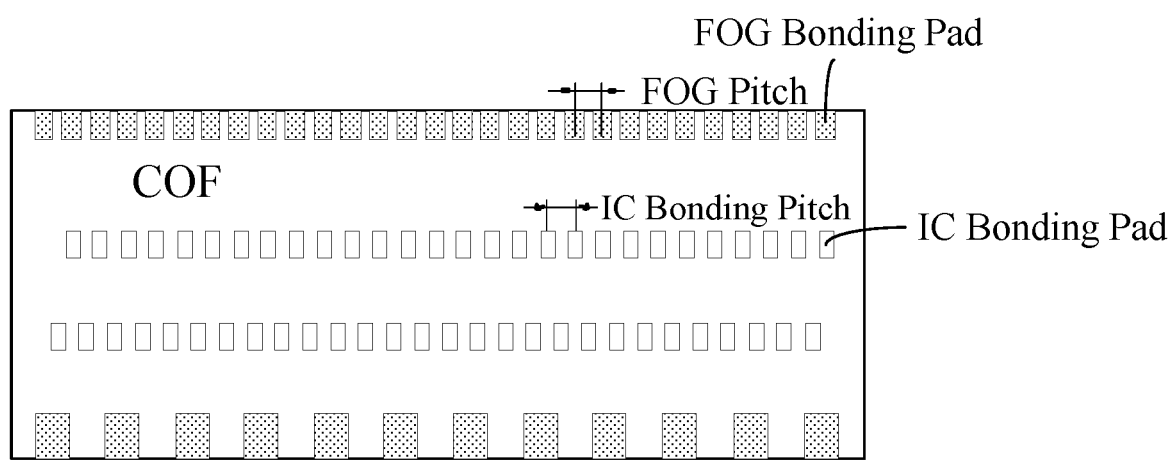
FIG. 4 is a schematic diagram of an IC bonding pad and an FPC bonding pad.

At present, based on the market technical investigation, the sizes of flat panel full-screen touch screen products in the future are mainly concentrated in medium-size to large-size. For a medium-size to large-size touch screen, two integrated circuits (IC) and two flexible printed circuits (FPC) are generally adopted. The touch screen product in the related art is as shown in FIG. 1, FPC1 and FPC2 are pressed on a glass substrate of an array substrate (namely, FPC On Glass (FOG)), and IC1 and IC2 are bonded to the glass substrate of the array substrate by an anisotropic conductive film (ACF) (namely, Chip On Glass (COG)). Due to the height of the IC and the fixed distance from the IC to an AA area required by COG Mura, a down border A is far from meeting the requirements for a full-screen border by a customer. However, considering the condition that a TDDI full-screen is the future development trend of a flat panel and the full-screen (the size of the down border) is the key bottleneck, a solution as shown in FIG. 2 is proposed, according to the solution, the way of bonding the IC on the FPC (namely, Chip On FPC (COF)) is adopted, so that the smaller lower border B is realized in comparison with the COG solution, and the full-screen may be further realized. As shown in FIG. 3, each of the touch electrodes (sensor) in the existing touch screen is electrically connected with one touch pad (e.g., Pad1, Pad12, . . . ) through the correspondingly electrically connected touch signal line L, so that the number of the touch pads is relatively large. For a large-size high-resolution full-screen touch screen, the number of the required touch pads is also relatively large. As shown in FIG. 4, limited by the influence of the existing process technologies, for example, the distance (FOG Pitch) between centers of FOG bonding pads, namely the bonding pitch, and the distance between centers of IC bonding pads, namely the IC bonding pitch, are limited, and the number of the effective touch pads which can be supported by the COF product is also limited, so that the problem of the limited number of the touch pads needs to be solved to realize the full-screen for the medium-size to large-size high-resolution touch screen product.

Figure 5:
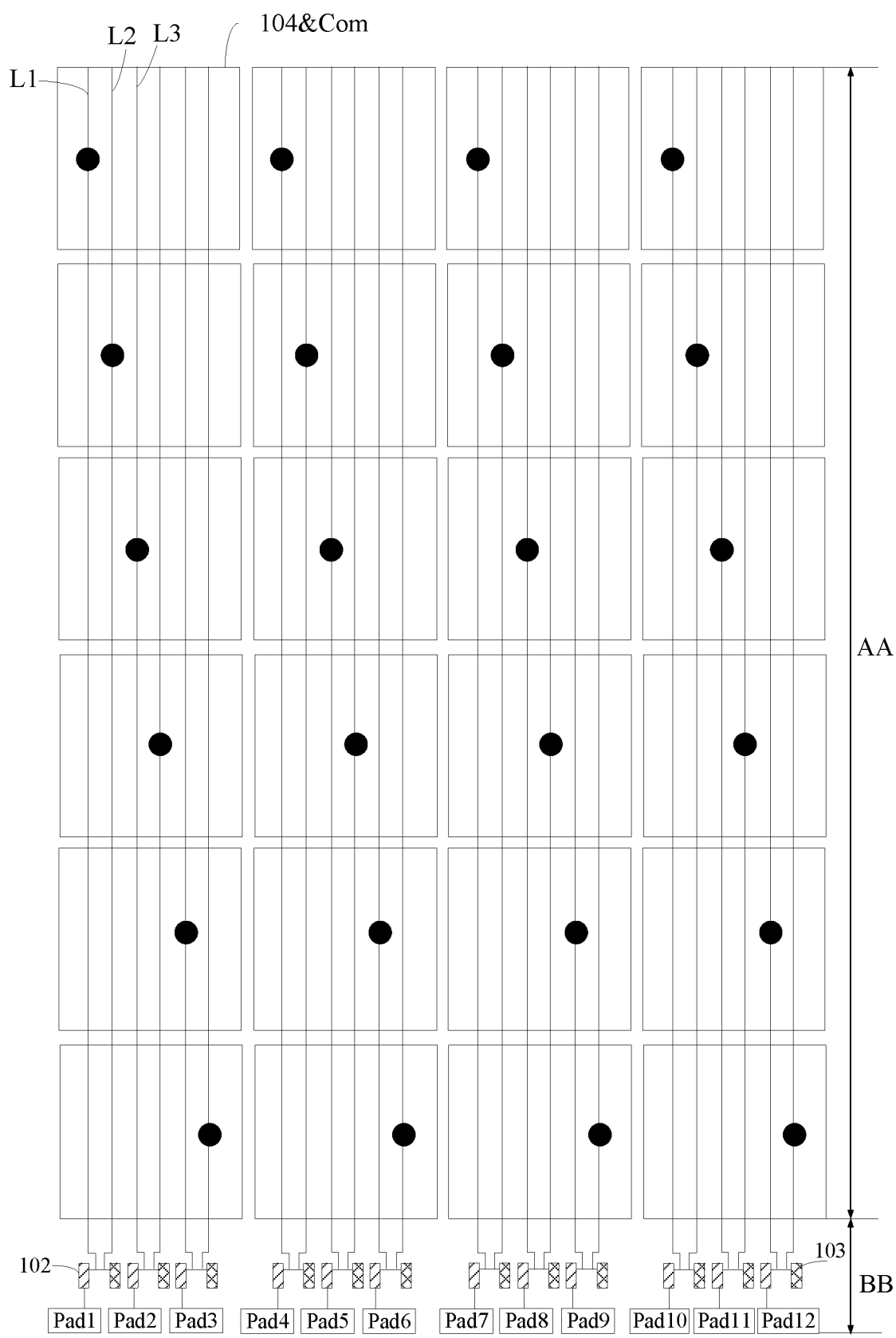
FIG. 5 is a schematic diagram of the structure of a display substrate provided by an embodiment of the present disclosure.
Figure 6:
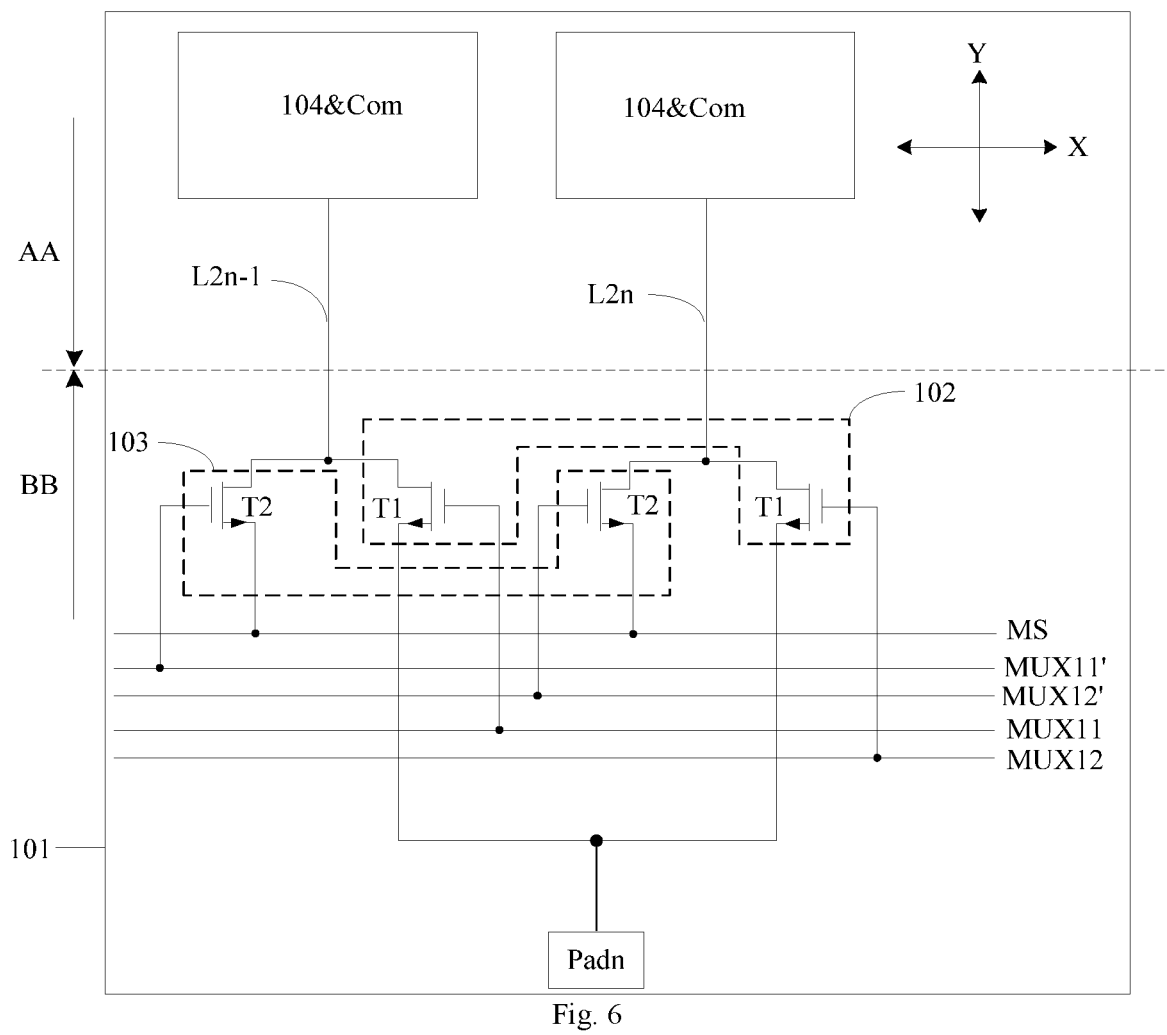
FIG. 6 is a schematic diagram of the structure of a touch selection circuit and a load compensation circuit connected with each other in FIG. 5.
Figure 7:
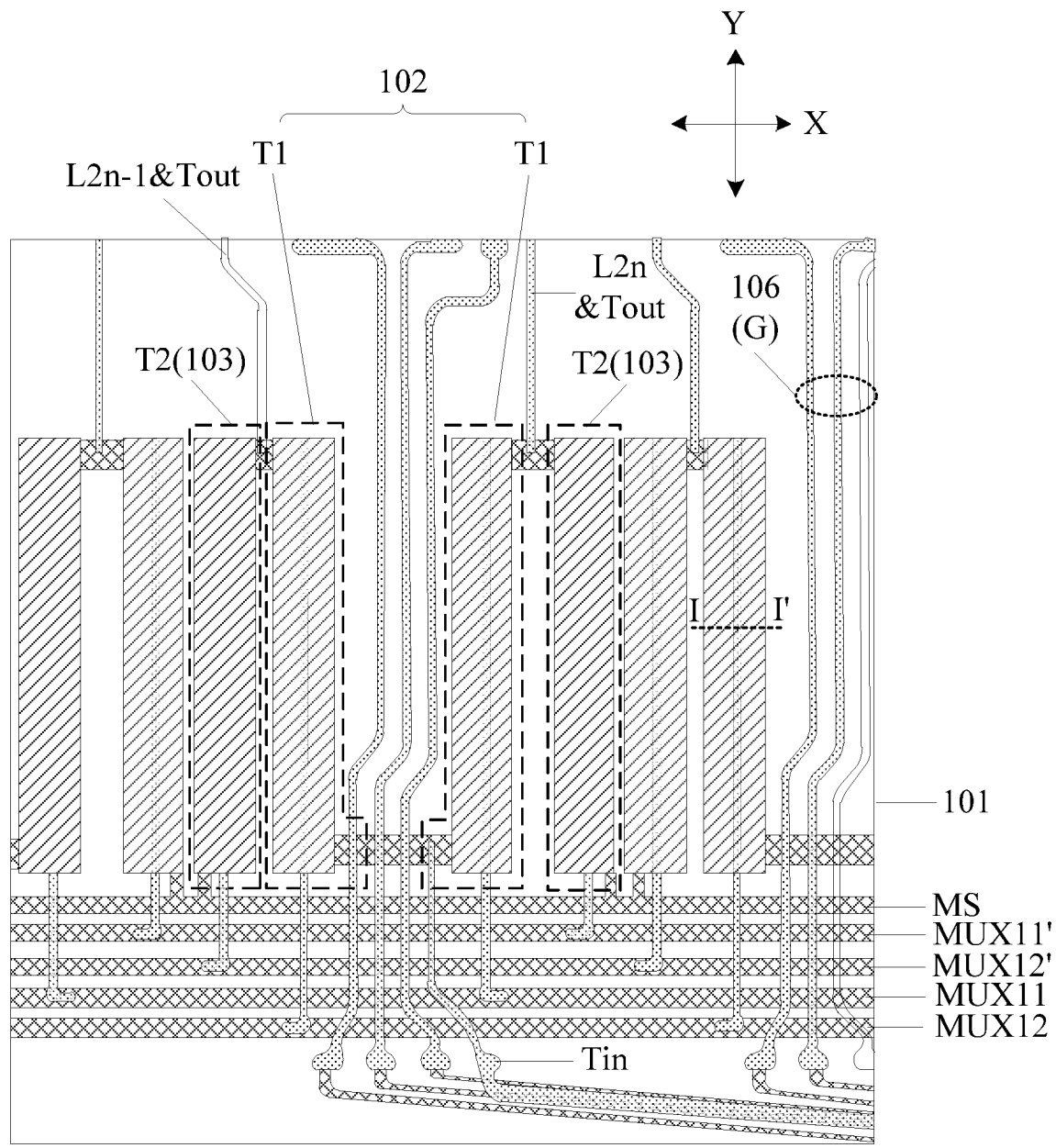
FIG. 7 is layout design of the touch selection circuit and the load compensation circuit connected with each other in FIG. 6.

In view of this, a display substrate provided by an embodiment of the present disclosure, as shown in FIG. 5 to FIG. 7, includes: a base substrate 101, wherein the base substrate 101 includes a display area AA and a non-display area BB on at least one side of the display area AA; a plurality of touch signal lines (L1, L2, L3 . . . ) in the display area AA; and a touch signal multiplexer, a compensator and a plurality of touch pads (Pad1, Pad2, Pad3, . . . ) in the non-display area BB. The touch signal multiplexer includes a plurality of groups of touch selection circuits 102, the compensator includes a plurality of groups of load compensation circuits 103, and the plurality of groups of load compensation circuits 103 are connected with the plurality of groups of touch selection circuits 102 respectively. Each group of touch selection circuits 102 includes one touch input Tin and at least two touch outputs Tout, the one touch input Tin is electrically connected with one touch pad, and one of the at least two touch outputs Tout is electrically connected with at least one of the touch signal lines. FIG. 5 to FIG. 7 take an example that each of the touch selection circuits 102 includes two touch outputs Tout and one touch output Tout is electrically connected with one touch signal line. One group of load compensation circuits 103 and one group of touch selection circuits 102 connected with each other are electrically connected with same touch signal lines. For example, one group of load compensation circuits 103 and one group of touch selection circuits 102 connected with each other at the leftmost side in FIG. 5 are both correspondingly electrically connected with the touch signal line L1 and the touch signal line L2. One group of load compensation circuits 103 and one group of touch selection circuits 102 connected with each other are arranged side by side in a vertical direction X (i.e., first direction) perpendicular to an extending direction (i.e., second direction) in which the touch signal lines extends.

During specific implementation, in a time period of touch, the touch selection circuits 102 are configured to load touch signals to the electrically connected touch signal lines (L1 and L2) in a time division mode through the touch pads (such as Pad1); and the load compensation circuits 103 are configured to load compensation signals to other touch signal lines (such as L2) electrically connected with one group of touch selection circuits 102 while the touch signals are loaded to one of the touch signal lines (such as L1) electrically connected with the touch selection circuits 102. The principle of loading the touch signals and the compensation signals will be described in detail below.

The display substrate provided by the embodiment of the present disclosure adopts the touch signal multiplexer to load the touch signals to the touch signal lines, and correspondingly electrically connects one touch pad with at least two touch signal lines, so that the number of the touch pads can be greatly reduced for the medium-size to large-size high-resolution touch screens. In addition, while the touch pad loads the touch signals to one of the electrically connected touch signal lines and does not load the touch signals to other electrically connected touch signal lines, a parasitic capacitance may be generated between the touch electrode which is electrically connected with the touch signal line with the loaded touch signals and the touch electrode which is electrically connected with the touch signal line without the loaded touch signals. The parasitic capacitance may cause the touch electrode with the loaded touch signals to discharge, so that the touch electrode is not fully charged. Thus, in the present disclosure, by setting the load compensation circuits in one-to-one correspondence with the selection circuits, while the touch pad loads the touch signals to one of the touch signal lines electrically connected with the touch pad, the load compensation circuit may load compensation signals to other touch signal lines electrically connected with the touch pad and without the loaded touch signals, and then the parasitic capacitances generated between the touch electrode with the loaded touch signals and the touch electrodes without the loaded touch signals cannot affect the loading of the touch signals, so that the touch electrode is fully charged. Therefore, the display substrate provided by the embodiment of the present disclosure can not only solve the problem of the limited number of the pads in the existing high-resolution medium-size to large-size touch screen products, but also solve the problem of incomplete charging of the touch electrodes in the charging process. In addition, in the present disclosure, by arranging the touch selection circuits 102 and the load compensation circuits 103 in the vertical X of the touch signal lines, space of the non-display area BB in the vertical direction X of the touch signal lines is reasonably utilized, thereby saving space of the non-display area BB in an extending direction Y of the touch signal lines, facilitating narrow border design.

It should be noted that the medium-size to large-size touch screen mentioned in the embodiment of the present disclosure refers to a touch screen with the size of 8 inches or more. The high resolution mentioned in the embodiment of the present disclosure refers to the resolution of 2K, 4K, 8K or even higher. For example, for a touch screen with the size of 10.1-11.1 inches, the resolution is WU (1200RGB*1920) and WQ (1600RGB*2560). In addition, "one touch pad" in the present disclosure is a pad giving the same signal, and may be composed of a plurality of branch pads in parallel.

In some possible implementations, as shown in FIGS. 6 and 7, the display substrate provided by the embodiment of the present disclosure further includes at least two first control signal lines in the non-display area BB (FIGS. 6 and 7 take an example of including two first control signal lines MUX11 and MUX12). Each group of touch selection circuits 102 includes: at least two groups of first switching transistors T1 (FIG. 6 takes an example that two groups of first switching transistors T1 are included, and each group includes one first switching transistor T1), one group of first switching transistors T1 is electrically connected with at least one of the touch signal lines (FIGS. 6 and 7 take an example that one group of first switching transistors T1 are electrically connected with the touch signal lines in one-to-one correspondence), and it is equivalent that one group of touch selection circuits 102 is correspondingly electrically connected with at least two touch signal lines (for example, in FIG. 6, the touch selection circuits 102 are electrically connected with two touch signal lines L2n−1 and L2n, where n is any positive integer). Optionally, the total number of the first control signal lines is the same as the number of the groups of the first switching transistors T1 contained in one group of touch selection circuits 102. Specifically, gates of the respective groups of first switching transistors T1 are electrically connected with the respective first control signal lines (for example, in FIG. 6, the gates of the left group of first switching transistors T1 in each group of touch selection circuits 102 are electrically connected with the first control signal line MUX11, and the gates of the right group of first switching transistors T1 are electrically connected with the first control signal line MUX12), first terminals of the respective groups of first switching transistors T1 are electrically connected with the respective touch signal lines (for example, in FIG. 6, the first terminals of the left group of first switching transistors T1 are electrically connected with the touch signal line L2n−1, and the first terminals of the right group of first switching transistors T1 are electrically connected with the touch signal line L2n), and second terminals of all the groups of first switching transistors T1 are electrically connected with one same touch pad (for example, in FIG. 6, the second terminals of the two groups of first switching transistors T1 are both electrically connected with the touch pad Padn). During specific implementation, with the groups where the first switching transistors T1 are located as units, by controlling the groups of first switching transistors T1 in the touch selection circuits 102 to be turned on or off in time-division mode, touch signals provided by the touch pads may be provided to the different touch signal lines in a time division mode through the turned-on first switching transistors T1.

Figure 8:
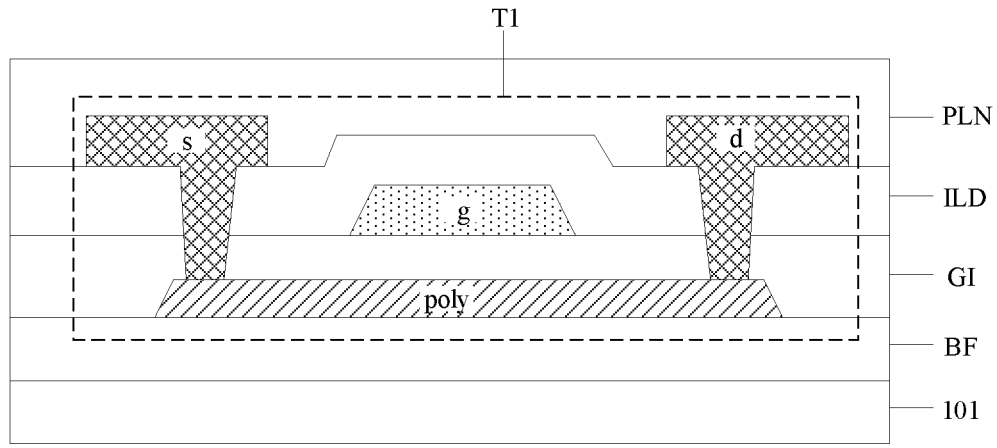
FIG. 8 is a cross-sectional view along line IT in FIG. 7.

Optionally, as shown in FIG. 8, the first switching transistors T1 may be top-gate type structures, including active layers poly, gates g, sources s and drains d. The first terminals of the first switching transistors T1 may be the sources s, and the second terminals may be the drains d; or, the first terminals of the first switching transistors T1 may be the drains d, and the second terminals may be the sources s, which is not limited here. Generally, a buffer layer BF is between the base substrate 101 and the active layers poly, a gate insulating layer GI is between the active layers poly and a layer where the gates g are located, an interlayer dielectric layer ILD is between the layer where the gates g are located and layers where the sources s and the drains d are located, a planarization layer PLN is on a side of the layers where the sources s and the drains d are located away from the base substrate 101, and other film layers in the display substrate known by those skilled in the art are not introduced here and should not limit the present disclosure.

In some possible implementations, as shown in FIGS. 6 and 7, the display substrate provided by the embodiment of the present disclosure further includes at least two second control signal lines (FIG. 6 takes an example of including two second control signal lines MUX11' and MUX12') and a compensation signal line MS in the non-display area BB.

Each of the load compensation circuits 103 includes: at least two groups of second switching transistors T2 (FIG. 6 takes an example that two groups of second switching transistors T2 are included, and each group includes one second switching transistor T2), and one group of second switching transistors T2 is electrically connected with at least one of the touch signal lines (FIGS. 6 and 7 take an example that the second switching transistors T2 are electrically connected with the touch signal lines in one-to-one correspondence). It is equivalent that one group of load compensation circuits 103 is correspondingly electrically connected with at least two touch signal lines (for example, in FIG. 6, the load compensation circuits 103 are electrically connected with the touch signal lines L2n−1 and L2n). Optionally, the total number of the second control signal lines is the same as the number of groups of the second switching transistors T2 contained in one group of load compensation circuits 103. Specifically, gates of the respective groups of second switching transistors T2 are electrically connected with the respective second control signal lines (for example, in FIG. 6, the gates of the left group of second switching transistors T2 in each group of load compensation circuits 103 are electrically connected with the second control signal line MUX11', and the gates of the right group of second switching transistors T2 are electrically connected with the second control signal line MUX12'), first terminals of the respective groups of second switching transistors T2 are electrically connected with the respective touch signal lines (for example, in FIG. 6, the first terminals of the left group of second switching transistors T2 are electrically connected with the touch signal line L2n−1, and the first terminals of the right group of second switching transistors T2 are electrically connected with the touch signal line L2n), and second terminals of all the groups of second switching transistors T2 are electrically connected with the compensation signal line MS. During specific implementation, with the groups where the second switching transistors T2 are located as units, by controlling the groups of second switching transistors T2 in the load compensation circuits 103 to be turned on or off in the time-division mode, compensation signals (LFD) provided by the compensation signal line MS may be provided to the different touch signal lines in a time division mode through the turned-on second switching transistors T2.

In some possible implementations, in the display substrate provided by the embodiment of the present disclosure, as shown in FIG. 6, the first switching transistor T1 and the second switching transistor T2 electrically connected with the one same touch signal line (e.g., L2n−1) are configured that, within a same time duration, in a condition that the first switching transistor T1 is turned on, the second switching transistor T2 is turned off, and in a condition that the first switching transistor T1 is turned off, the second switching transistor T2 is turned on. Exemplarily, as shown in FIG. 6, in the time period of touch, the touch pads Padn load the touch signals to the touch signal lines L2n−1 and L2n in a time division mode, and in the condition that the first switching transistor T1 electrically connected with the touch signal line L2n−1 is in an on state, the first switching transistor T1 electrically connected with the touch signal line L2n is in an off state, the second switching transistor T2 electrically connected with the touch signal line L2n−1 is in an off state, and the second switching transistor T2 electrically connected with the touch signal line L2n is in an on state, the compensation signal line MS may load the compensation signals to the touch signal line L2n through the turned-on second switching transistor T2 while the touch pads Padn load the touch signals to the touch signal line L2n-1 through the turned-on first switching transistor T1, so that complete charging of the touch signal line L2n-1 is achieved, and so on.

Figure 9:
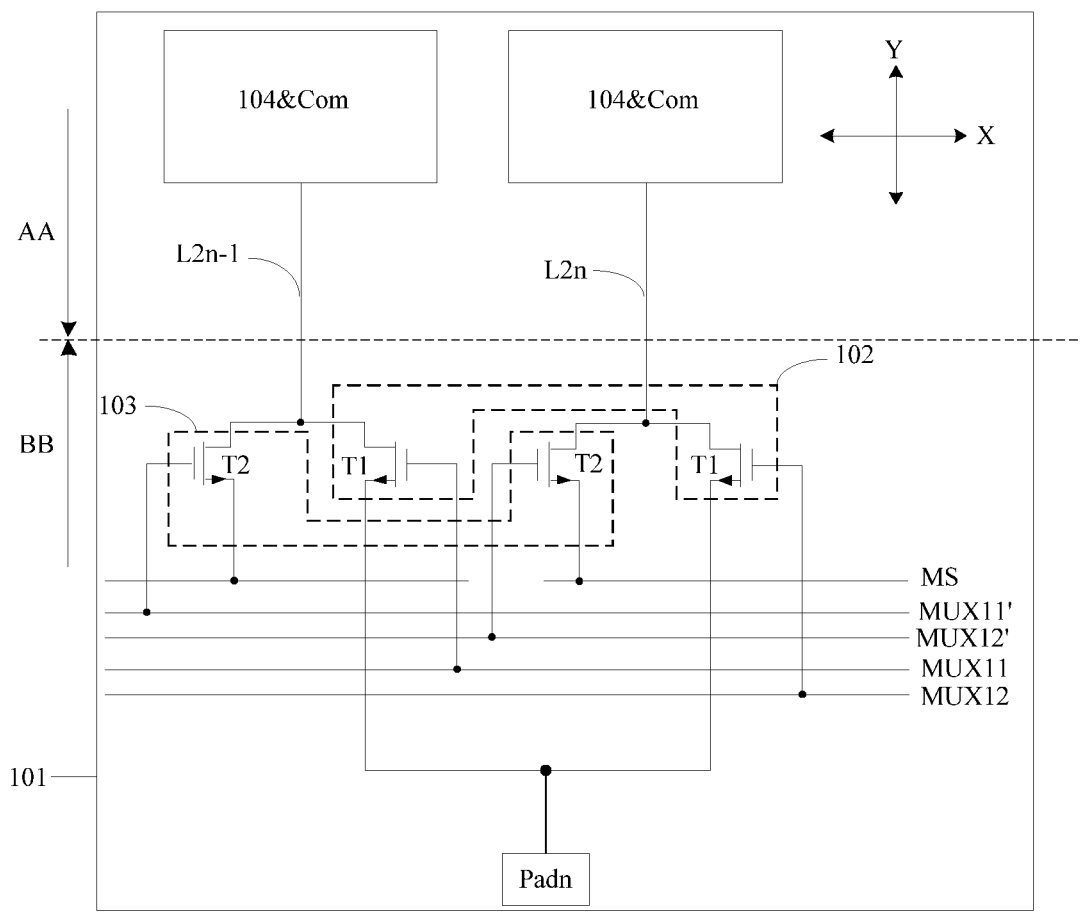
FIG. 9 is a schematic diagram of another structure of a touch selection circuit and a load compensation circuit connected with each other in FIG. 5.

In some possible implementations, in the display substrate provided by the embodiment of the present disclosure, as shown in FIGS. 6 and 7, the second terminals of all the second switching transistors T2 are electrically connected with one same compensation signal line MS. In this way, the compensation signal lines MS can be saved, and the complexity of wiring can be reduced. Of course, during specific implementation, as shown in FIG. 9, all the second switching transistors T2 may also be divided into left and right parts, the second terminals of the second switching transistors T2 in the left half part are electrically connected with one same compensation signal line MS, and the second terminals of the second switching transistors T2 in the right half part are electrically connected with another same compensation signal line MS. During specific implementation, the number of the compensation signal lines MS is not limited to one or two and can be designed according to actual needs.

Figure 10:
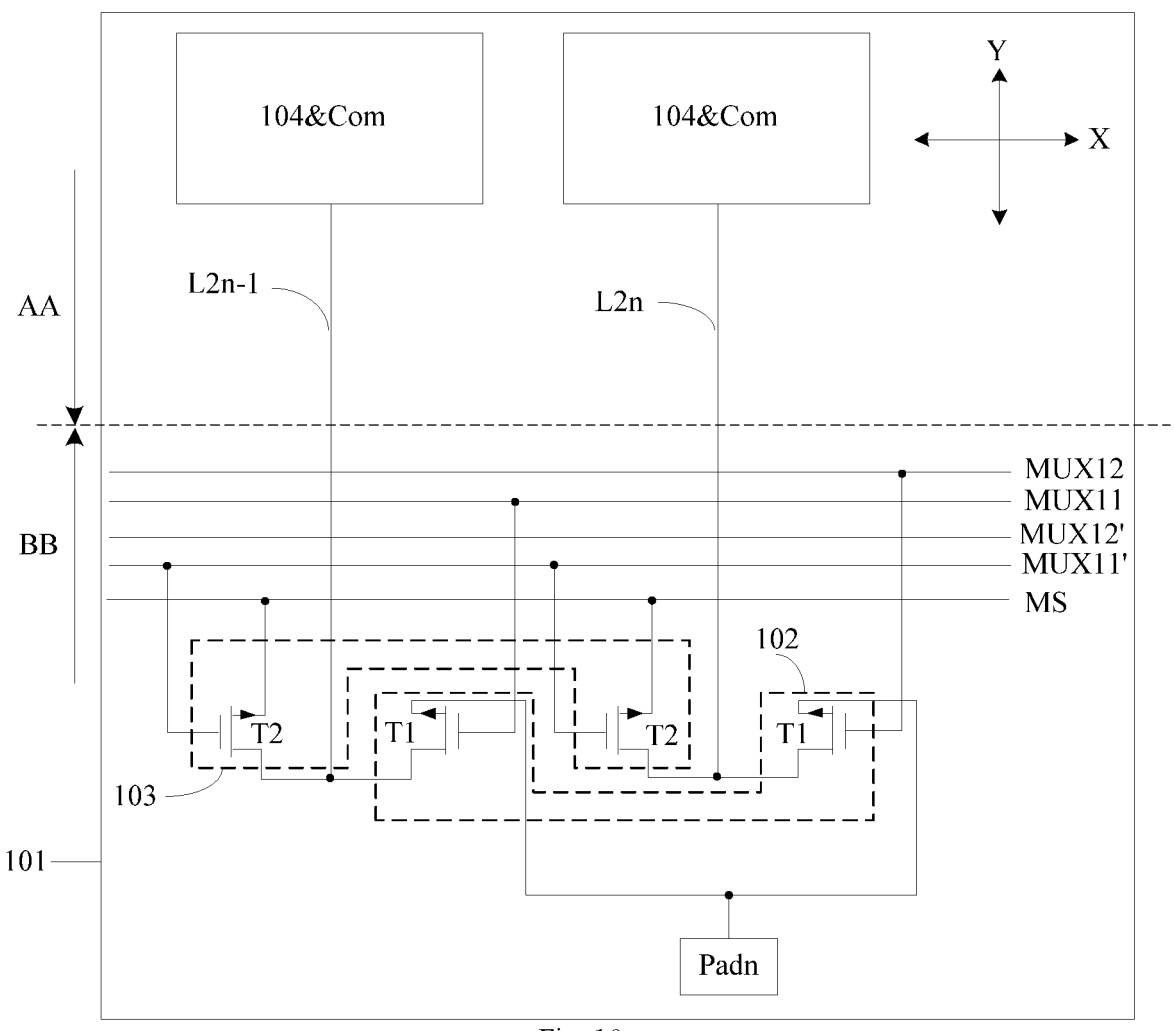
FIG. 10 is a schematic diagram of another structure of a touch selection circuit and a load compensation circuit connected with each other in FIG. 5.
Figure 11:
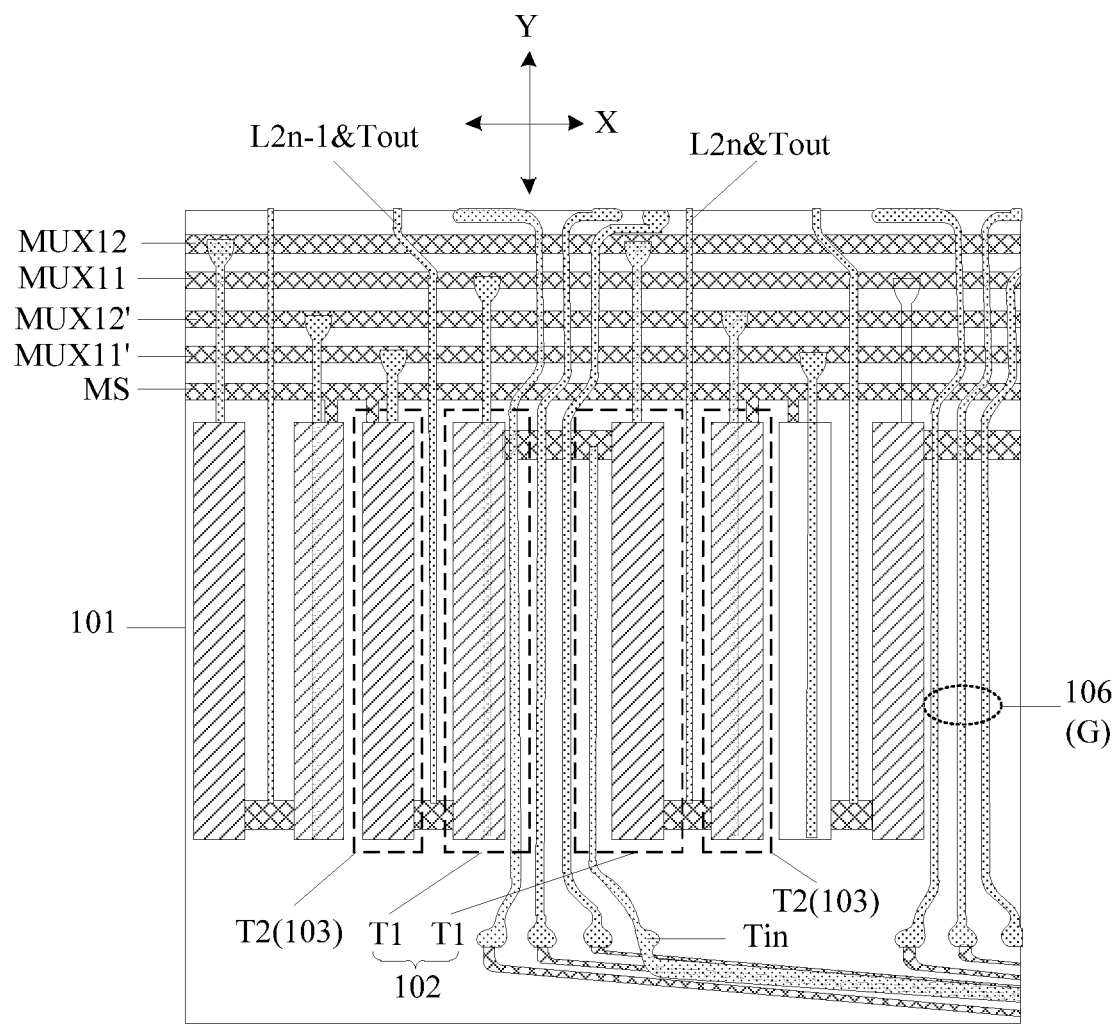
FIG. 11 is a schematic diagram of another structure of a touch selection circuit and a load compensation circuit connected with each other in FIG. 10.
Figure 12:
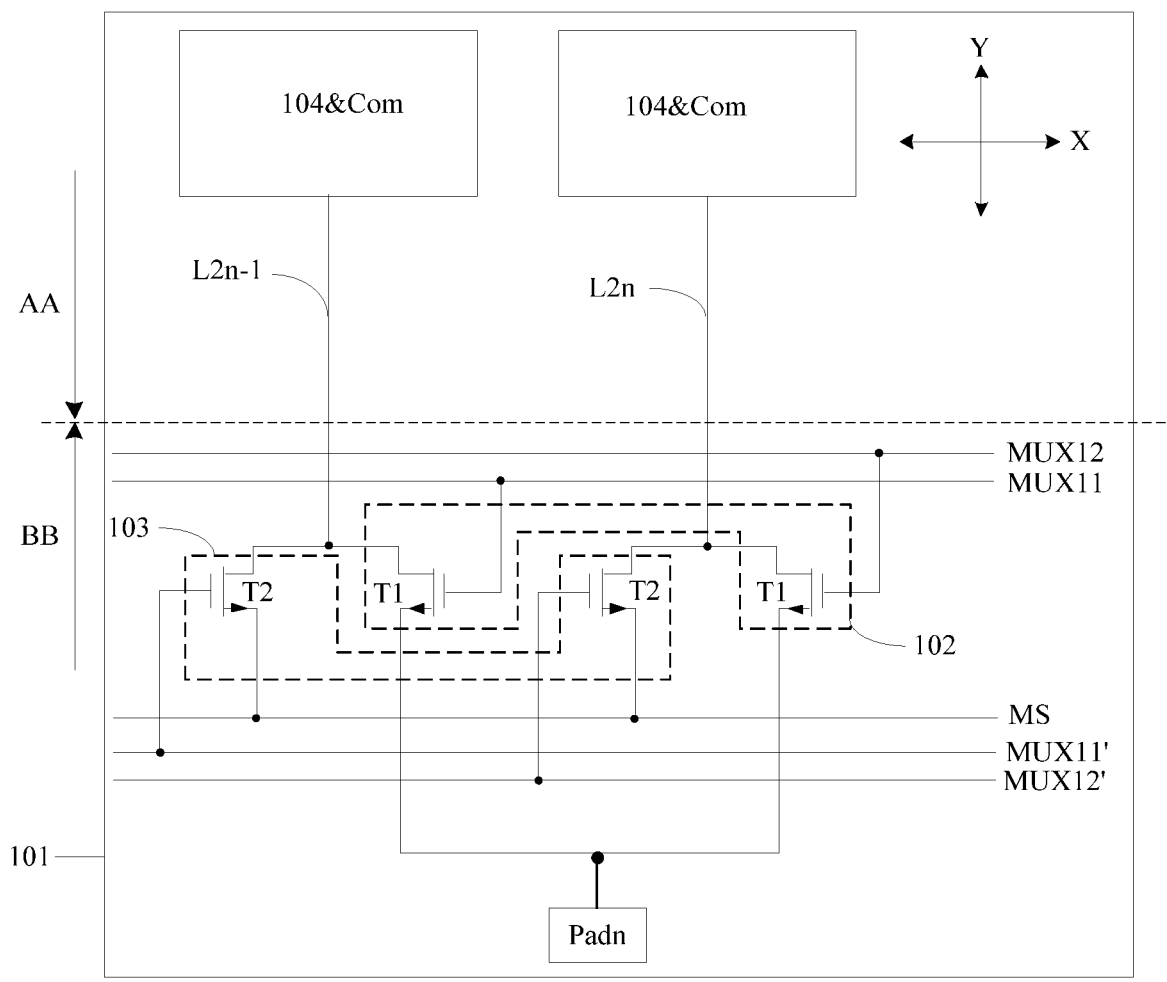
FIG. 12 is a schematic diagram of another structure of a touch selection circuit and a load compensation circuit connected with each other in FIG. 5.
Figure 13:
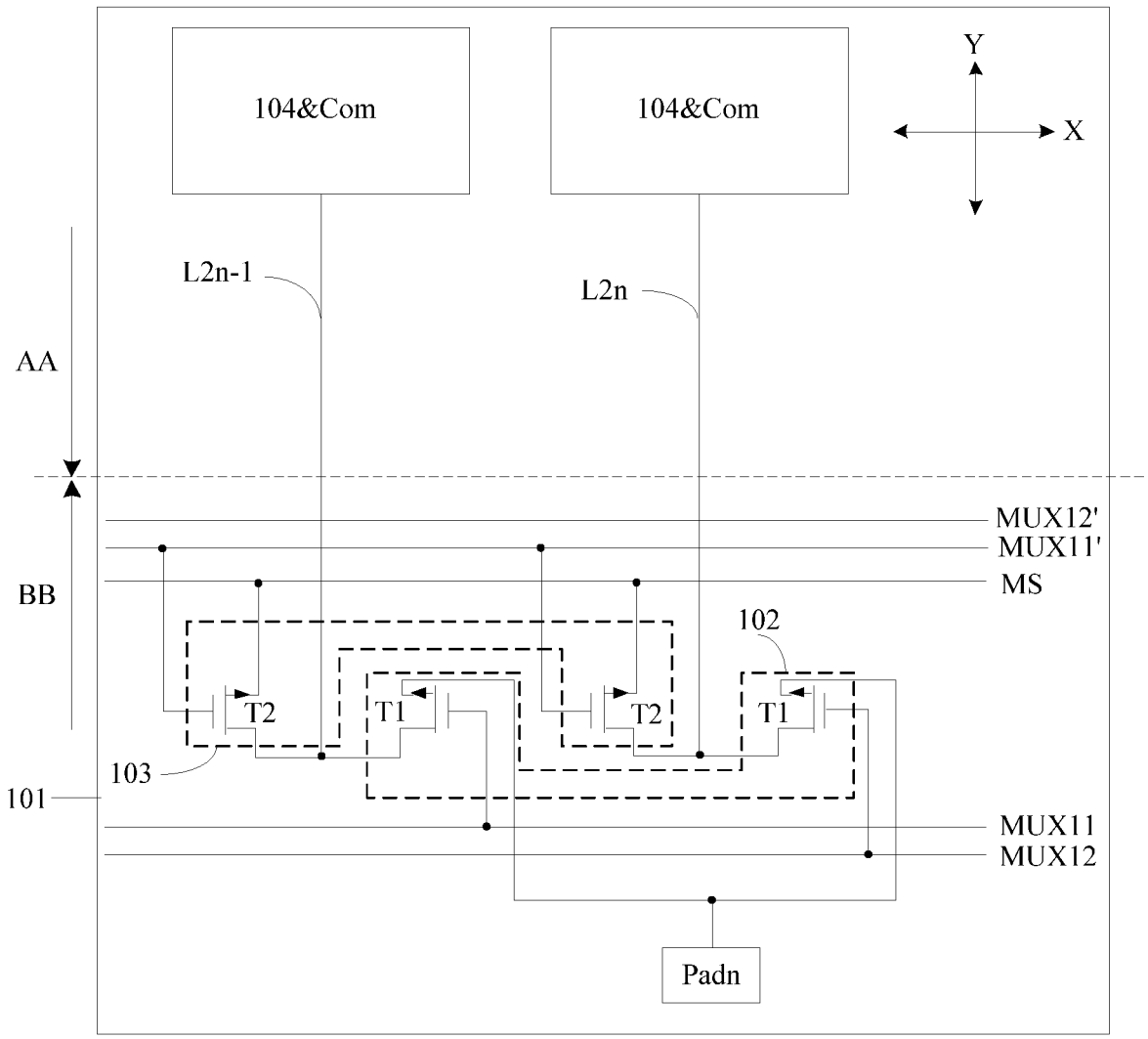
FIG. 13 is a schematic diagram of another structure of a touch selection circuit and a load compensation circuit connected with each other in FIG. 5.

In some possible implementations, in the display substrate provided by the embodiment of the present disclosure, in order to reasonably utilize space of the non-display area BB, as shown in FIG. 6 to FIG. 13, all the first control signal lines (e.g., MUX11 and MUX12), all the second control signal lines (e.g., MUX11' and MUX12') and the compensation signal line MS may extend in the vertical direction X of the touch signal lines. Optionally, as shown in FIG. 6 to FIG. 8, all the first control signal lines (e.g., MUX11 and MUX12), all the second control signal lines (e.g., MUX11' and MUX12') and the compensation signal line MS may be between the plurality of groups of touch selection circuits 102 and the plurality of touch pads (e.g., Pad1, Pad2, Pad3, . . . ). Or, as shown in FIGS. 9 and 10, all the first control signal lines (e.g., MUX11 and MUX12), all the second control signal lines (e.g., MUX11' and MUX12') and the compensation signal line MS may be between the plurality of groups of touch selection circuits 102 and the display area AA. Or, as shown in FIGS. 12 and 13, all the first control signal lines (e.g., MUX11 and MUX12) may be on a side (e.g., an upper side in FIG. 12 and a lower side in FIG. 13), along the vertical direction X of the touch signal lines (e.g., L2n-1 and L2n), of the plurality of groups of touch selection circuits 102, and all the second control signal lines (e.g., MUX11' and MUX12') and the compensation signal line MS may be on the other side (e.g., a lower side in FIG. 12 and an upper side in FIG. 13), along the vertical direction X of the touch signal lines (e.g., L2n-1 and L2n), of the plurality of groups of touch selection circuits 102.

In some possible implementations, in the display substrate provided by the embodiment of the present disclosure, as shown in FIG. 6 to FIG. 13, when all the second control signal lines (e.g., MUX11' and MUX12'), all the first control signal lines (e.g., MUX11 and MUX12) and the compensation signal line (MS) are on the same side, along the vertical direction X of the touch signal lines (e.g., L2n-1 and L2n), of the plurality of groups of touch selection circuits 102, to facilitate wiring, all the second control signal lines (e.g., MUX11' and MUX12') may be between all the first control signal lines (e.g., MUX11 and MUX12) and the compensation signal line (MS), and the compensation signal line MS is adjacent to the plurality of groups of touch selection circuits 102. Of course, during specific implementation, it is not limited to the above wiring manner, as long as the second control signal lines (e.g., MUX11' and MUX12'), the first control signal lines (e.g., MUX11 and MUX12) and the compensation signal line (MS) are arranged side by side in the extending direction Y of the touch signal lines (e.g., L1, L2, L3, . . . ), which is not specifically limited here.

Figure 14:
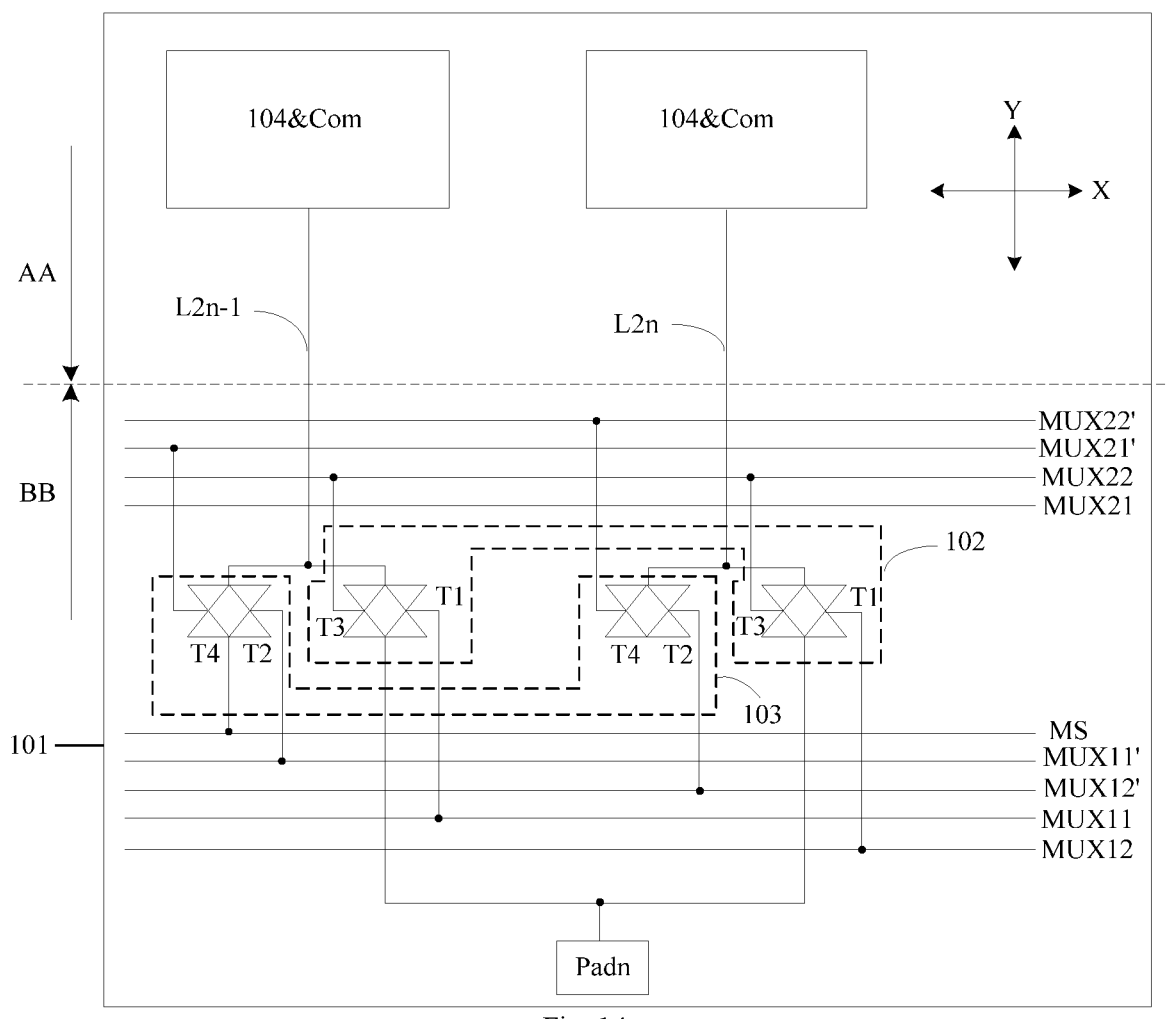
FIG. 14 is a schematic diagram of another structure of a touch selection circuit and a load compensation circuit connected with each other in FIG. 5.
Figure 15:
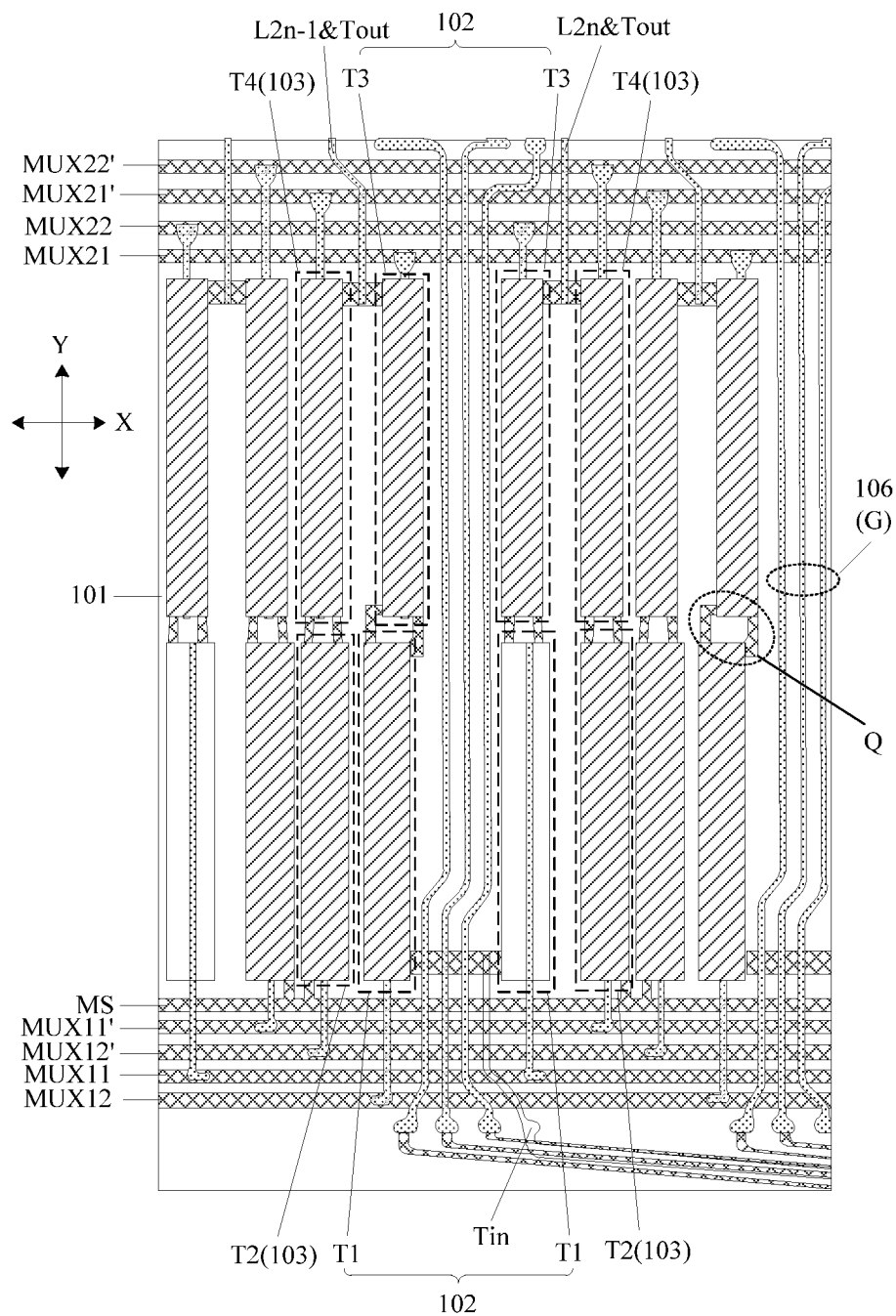
FIG. 15 is a schematic diagram of another structure of a touch selection circuit and a load compensation circuit connected with each other in FIG. 14.
Figure 16:
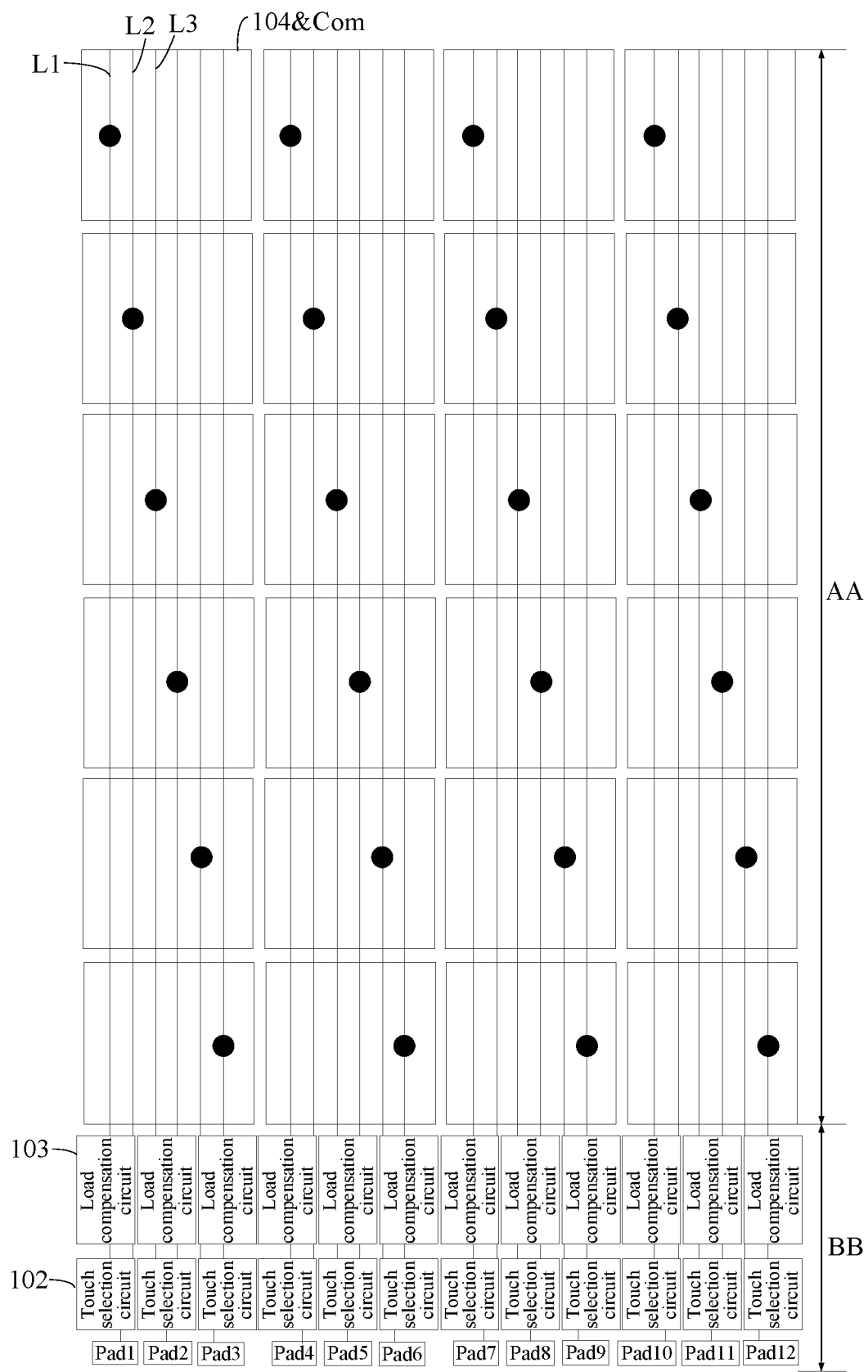
FIG. 16 is a schematic diagram of another structure of a display substrate provided by an embodiment of the present disclosure.

In some possible implementations, as shown in FIGS. 14 and 15, the display substrate provided by the embodiment of the present disclosure may further include at least two third control signal lines (e.g., MUX21 and MUX22) in the non-display area BB. Each group of touch selection circuits 102 further includes: at least two groups of third switching transistors T3 (for example, there are only two groups of third switching transistors T3, and each group of third switching transistors T3 includes one third switching transistor T3 or a plurality of third switching transistors T3 in parallel). Optionally, the total number of the third control signal lines (e.g., MUX21 and MUX22) is the same as the number of groups of the third switching transistors T3 contained in one group of touch selection circuits 102. Specifically, gates of the respective groups of third switching transistors T3 are electrically connected with the respective third control signal lines (for example, in FIG. 14, the gates of the left group of third switching transistors T3 in the touch selection circuits 102 are electrically connected with the third control signal line MUX21, and the gates of the right group of third switching transistors T3 are electrically connected with the third control signal line MUX22). The respective groups of third switching transistors T3 and the respective groups of first switching transistors T1 are arranged in one-to-one correspondence, first terminals of the third switching transistors T3 are electrically connected with the second terminals of the corresponding first switching transistors T1, and second terminals of the third switching transistors T3 are electrically connected with the first terminals of the corresponding first switching transistors T1. The touch selection circuits 102 include the first switching transistors T1 and the third switching transistors T3, and compared with the touch selection circuits 102 only composed of the first switching transistors T1, an on resistance of the touch selection circuits 102 is effectively lowered. Optionally, as shown in FIG. 15, the third switching transistor T3 and the first switching transistor T1 are connected by two fold lines at a connection position Q, and the two fold lines are connected towards different directions instead of linear connection, so that short circuiting caused by the too small distance between the sources and the drains may be avoided.

In some possible implementations, as shown in FIGS. 14 and 15, the display substrate provided by the embodiment of the present disclosure may further include at least two fourth control signal lines (e.g., MUX21' and MUX22') in the non-display area BB. Each group of load compensation circuits 103 may further include: at least two groups of fourth switching transistors T4 (for example, there are only two groups of fourth switching transistors T4, and each group of fourth switching transistors T4 includes one fourth switching transistor T4 or a plurality of fourth switching transistors T4 in parallel). Optionally, the total number of the fourth control signal lines (e.g., MUX21' and MUX22') is the same as the number of groups of the fourth switching transistors T4 contained in one group of load compensation circuits 103. Specifically, gates of the respective groups of fourth switching transistors T4 are electrically connected with the respective fourth control signal lines (for example, in FIG. 14, the gates of the left group of fourth switching transistors T4 in the load compensation circuits 103 are electrically connected with the fourth control signal line MUX21', and the gates of the right group of fourth switching transistors T4 are electrically connected with the fourth control signal line MUX22'). The respective groups of fourth switching transistors T4 and the respective groups of second switching transistors T2 are arranged in one-to-one correspondence, first terminals of the fourth switching transistors T4 are electrically connected with the second terminals of the corresponding second switching transistors T2, and second terminals of the fourth switching transistors T4 are electrically connected with the first terminals of the corresponding second switching transistors T2. The load compensation circuits 103 include the second switching transistors T2 and the fourth switching transistors T4, and compared with the load compensation circuits 103 only composed of the second switching transistors T2, an on resistance of the load compensation circuits 103 is effectively lowered.

In some possible implementations, in the display substrate provided by the embodiment of the present disclosure, as shown in FIG. 15, in order to reasonably utilize space of a border area BB, one group of third switching transistors T3 and the corresponding group of first switching transistors T1 may be sequentially arranged in an extending direction Y of the touch signal lines (e.g., L2$n$–1 and L2$n$); and one group of fourth switching transistors T4 and the corresponding group of second switching transistors T2 may be sequentially arranged in the extending direction Y of the touch signal lines (e.g., L2$n$–1 and L2$n$).

In some possible implementations, in the display substrate provided by the embodiment of the present disclosure, as shown in FIG. 15, in the vertical direction X of the touch signal lines (e.g., L2$n$–1 and L2$n$), the first switching transistors T1 and the second switching transistors T2 are arranged side by side and the third switching transistors T3 and the fourth switching transistors T4 are arranged side by side to fully utilize the space of the non-display area BB in the vertical direction X of the touch signal lines (e.g., L2$n$–1 and L2$n$), thereby saving the space of the non-display area BB in the extending direction Y of the touch signal lines (e.g., L2$n$–1 and L2$n$), and achieving narrow border design. Optionally, as shown in FIG. 15, in the first switching transistor T1, the second switching transistor T2, the third switching transistor T3 and the fourth switching transistor T4 connected to the same touch output Tout, along the vertical direction X of the touch signal lines, the distance between the third switching transistor T3 and the fourth switching transistor T4 arranged side by side is greater than the distance between the second switching transistor T2 and the first switching transistor T1 arranged side by side.

In some possible implementations, in the display substrate provided by the embodiment of the present disclosure, the first switching transistors T1 and the second switching transistors T2 may be N type transistors, and the third switching transistors T3 and the fourth switching transistors T4 may be P type transistors; or the first switching transistors T1 and the second switching transistors T2 may be P type transistors, and the third switching transistors T3 and the fourth switching transistors T4 may be N type transistors. It is equivalent that in the vertical direction X of the touch signal lines (e.g., L2$n$–1 and L2$n$), the first switching transistors T1 and the second switching transistors T2 arranged side by side are the same in type, and the third switching transistors T3 and the fourth switching transistors T4 arranged side by side are the same in type, so that the switching transistors can be conveniently manufactured, which facilitates volume production.

During specific implementation, the N type transistors are turned on under a high-level and turned off under a low-level; and the P type transistors are turned off under the low-level and turned on under the high-level. Besides, in the present disclosure, the first terminals of the N type transistors are drains, the second terminals thereof are sources, the first terminals of the P type transistors are sources, and the second terminals thereof are drains. In addition, the switching transistors in the present disclosure may be thin film transistors (TFT) or metal oxide semiconductor field effect transistors (MOS), which is not limited here.

In some possible implementations, in the display substrate provided by the embodiment of the present disclosure, each of one group of first switching transistors T1, one group of second switching transistors T2, one group of third switching transistors T3 and one group of fourth switching transistors T4 only includes one switching transistor, or includes at least two switching transistors in parallel. That is, one group of first switching transistors T1 may only include one first switching transistor T1, or includes a plurality of first switching transistors T1 in parallel; one group of second switching transistors T2 may only include one second switching transistor T2, or includes a plurality of second switching transistors T2 in parallel; one group of third switching transistors T3 may only include one third switching transistor T3, or includes a plurality of third switching transistors T3 in parallel; and one group of fourth switching transistors T4 may only include one fourth switching transistor T4, or includes a plurality of fourth switching transistors T4 in parallel. When each group includes the plurality of switching transistors in parallel, an overall on resistance of this group of switching transistors may be effectively lowered.

In some possible implementations, in the display substrate provided by the embodiment of the present disclosure, as shown in FIGS. 14 and 15, all the first control signal lines (e.g., MUX11 and MUX12), all the second control signal lines (e.g., MUX11' and MUX12'), all the third control signal lines (e.g., MUX21 and MUX22), all the fourth control signal lines (e.g., MUX21' and MUX22') and the compensation signal line MS may extend in the vertical direction X of the touch signal lines (e.g., L2$n$–1 and L2$n$). All the first control signal lines (e.g., MUX11 and MUX12), all the second control signal lines (e.g., MUX11' and MUX12') and the compensation signal line MS are on a side, along the vertical direction X of the touch signal lines (e.g., L1, L2, L3, . . . ), of the plurality of groups of touch selection circuits 102, and all the third control signal lines (e.g., MUX21 and MUX22) and all the fourth control signal lines (e.g., MUX21' and MUX22') are on the other side, along the vertical direction X of the touch signal lines (e.g., L2$n$–1 and L2$n$), of the plurality of groups of touch selection circuits 102, so that the signal lines and the electrically connected switching transistors may be adjacent, facilitating reduction of losses of signals on transmission paths, and improving the signal authenticity.

In some possible implementations, in the display substrate provided by the embodiment of the present disclosure, as shown in FIG. 16 to FIG. 20, the plurality of groups of load compensation circuits 103 may also be between the plurality of groups of touch selection circuits 102 and the display area AA. Although it is not conductive to reducing the width of the non-display area BB, the number of the pads in the medium-size to large-size high-resolution display screen can still be reduced. The specific structures of the touch selection circuits 102 and the load compensation circuits 103 can refer to the above-mentioned content, which are omitted here.

In some possible implementations, as shown in FIG. 5, FIG. 6, FIG. 9, FIG. 10, FIG. 14, FIG. 16 to FIG. 20, the display substrate provided by the embodiment of the present disclosure may further include: a plurality of touch electrodes 104 in the display area AA. These touch electrodes 104 are electrically connected with the touch signal lines (e.g., L1, L2, L3, . . . ). Optionally, the touch electrodes 104 are electrically connected with the touch signal lines (e.g., L1, L2, L3, . . . ) in one-to-one correspondence. The touch electrodes 104 electrically connected with each group of touch selection circuits 102 through the touch signal lines may be in a same row (as shown in FIG. 6, FIG. 9, FIG. 10 and FIG. 14) or a same column (as shown in FIG. 5, FIG. 16 to FIG. 20).

In some possible implementations, as shown in FIG. 5, FIG. 6, FIG. 9, FIG. 10, FIG. 14, FIG. 16 to FIG. 20, the display substrate provided by the embodiment of the present disclosure may further include a plurality of common electrode blocks Com in the display area AA, and the common electrode blocks Com may be multiplexed as the touch electrodes 104. In this way, a process for separately manufacturing a layer of touch electrodes 104 can be omitted, and the thickness of the display substrate is lowered, which facilitates thinning design.

Figure 17:
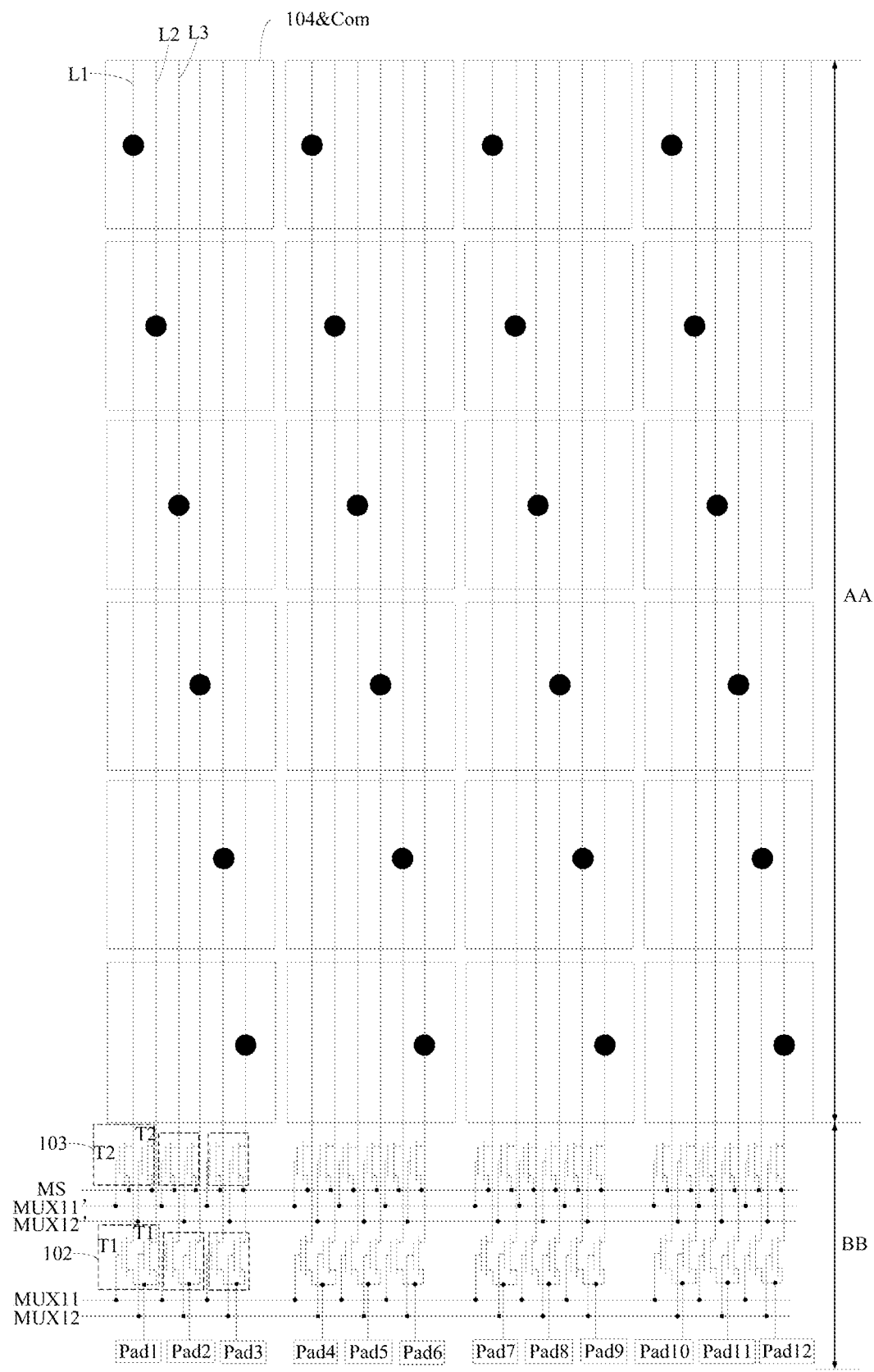
FIG. 17 is a schematic diagram of the structure of a touch selection circuit and a load compensation circuit connected with each other in FIG. 16.
Figure 18:
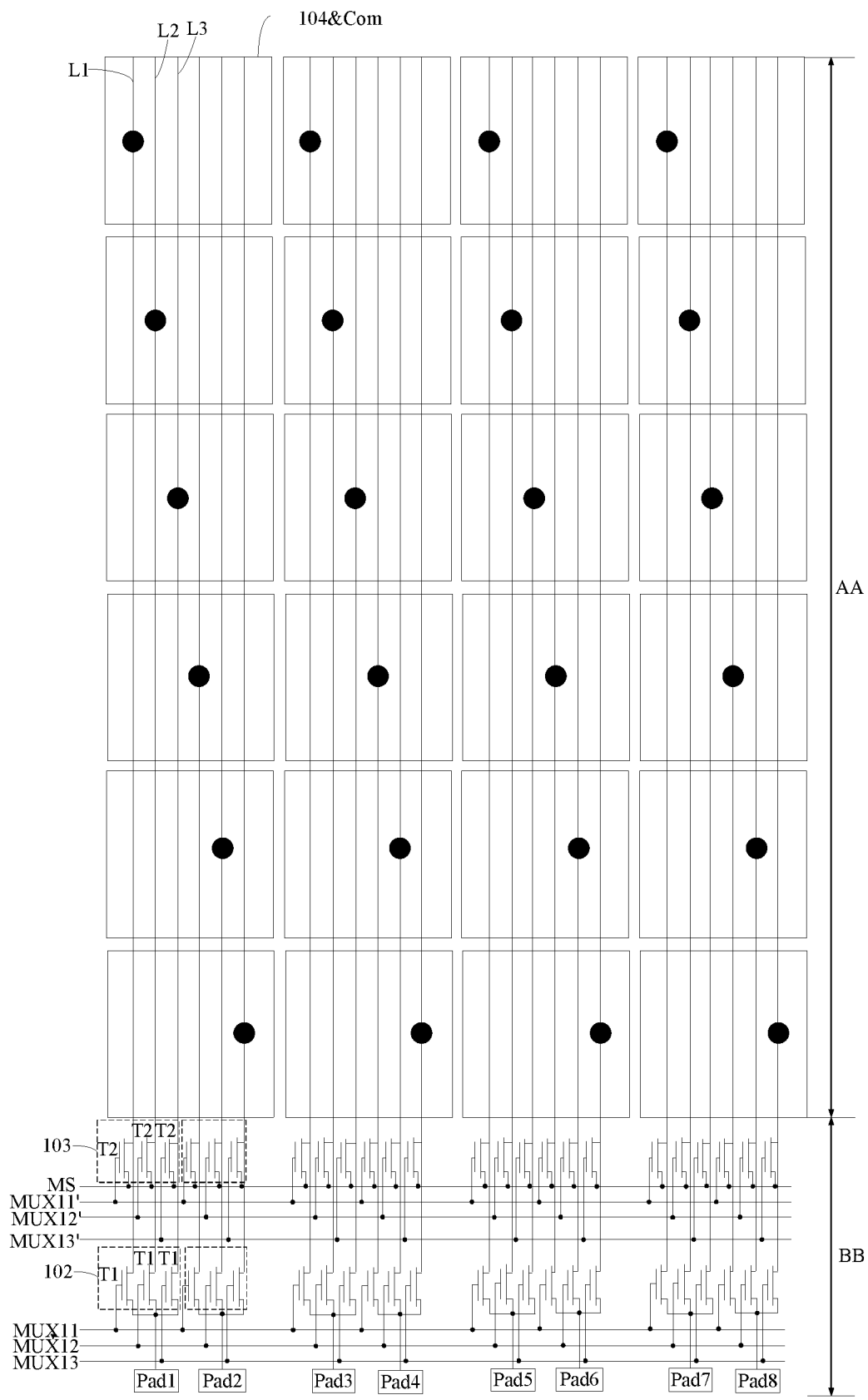
FIG. 18 is a schematic diagram of another structure of a touch selection circuit and a load compensation circuit connected with each other in FIG. 16.
Figure 19:
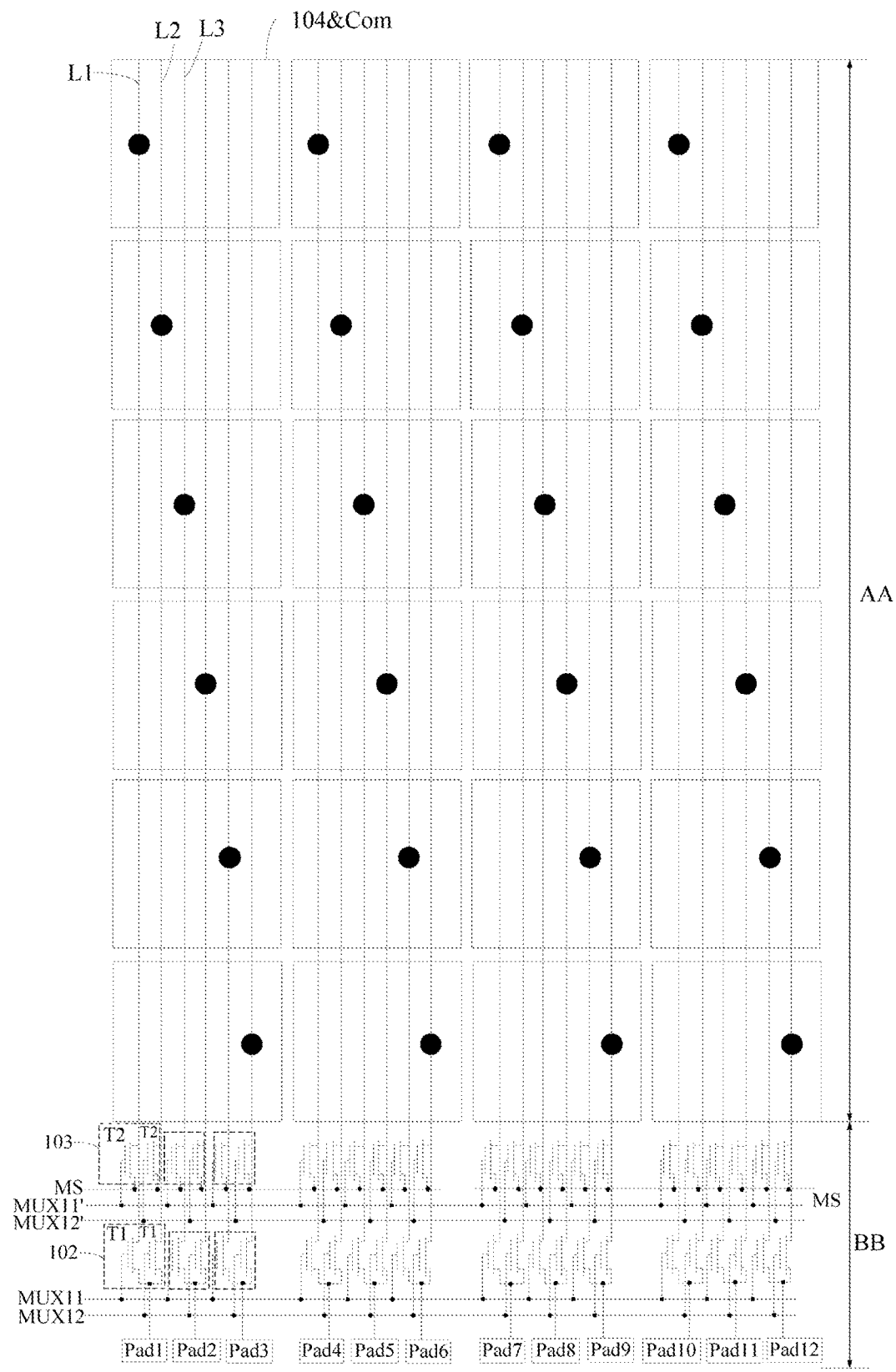
FIG. 19 is a schematic diagram of another structure of a display substrate provided by an embodiment of the present disclosure.
Figure 20:
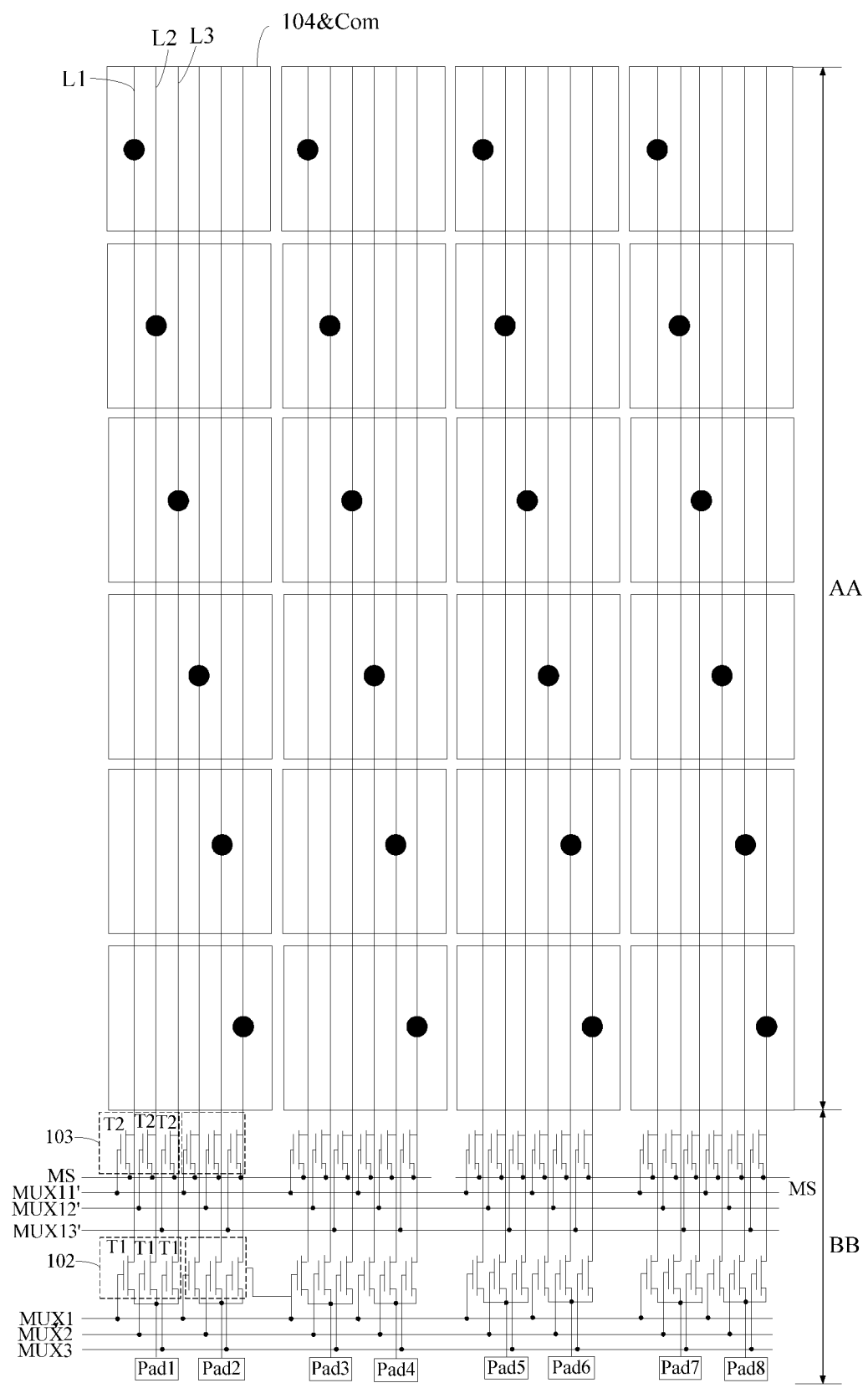
FIG. 20 is a schematic diagram of another structure of a display substrate provided by an embodiment of the present disclosure.

It should be noted that the display substrate provided by the embodiment of the present disclosure takes an example that one touch pad is electrically connected with two (as shown in FIG. 6, FIG. 9, FIG. 10, FIG. 14, FIG. 17 and FIG. 19) or three touch signal lines (as shown in FIG. 18 and FIG. 20) at the same time through one touch selection circuit 102. Of course, during specific implementation, one touch pad may be further electrically connected with four or even more touch signal lines at the same time through one touch selection circuit 102. This can be designed specifically according to actual needs (the size of the display substrate), and will not be listed one by one in the present disclosure.

Figure 21:
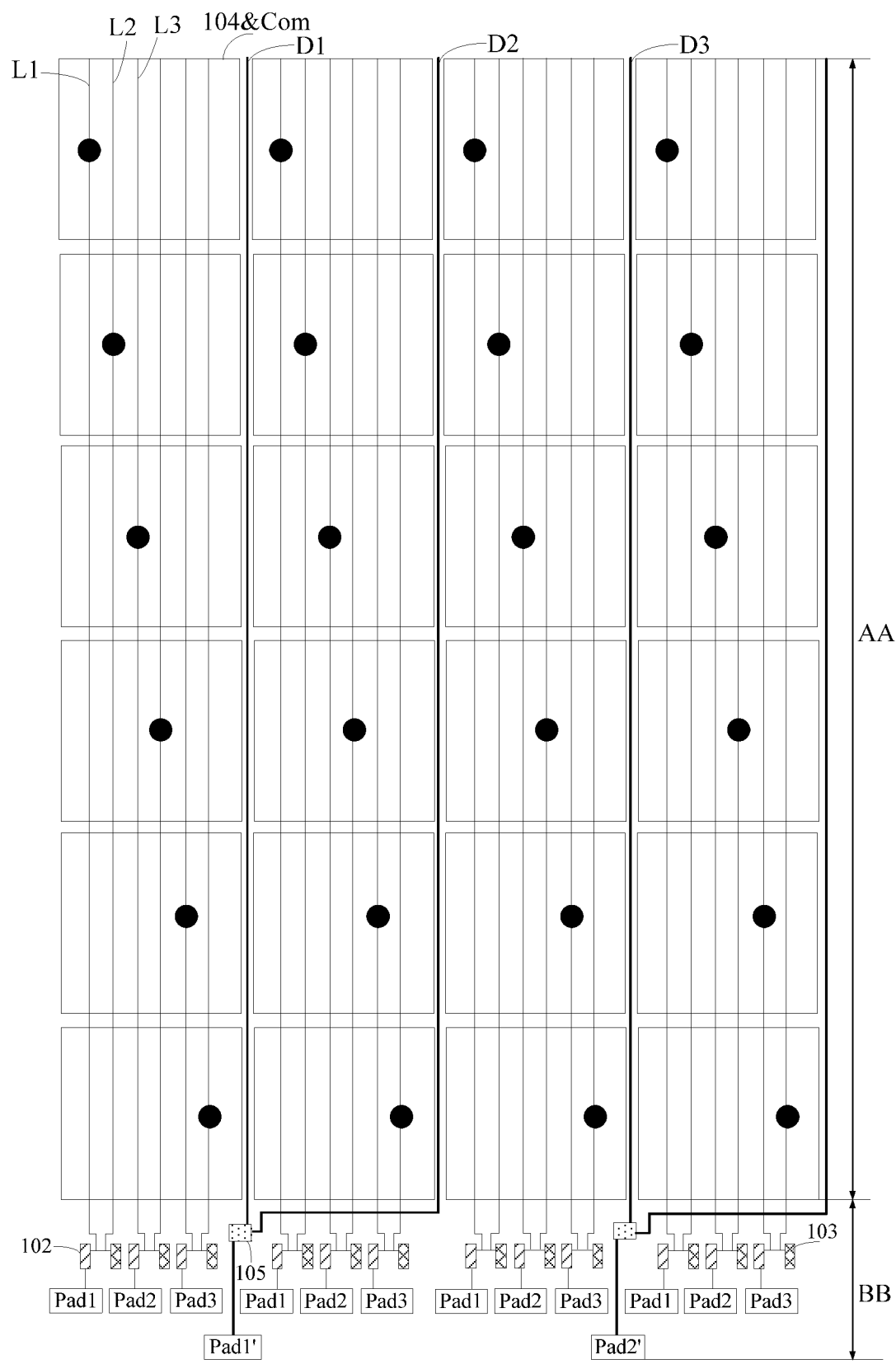
FIG. 21 is a schematic diagram of another structure of a display substrate provided by an embodiment of the present disclosure.
Figure 22:
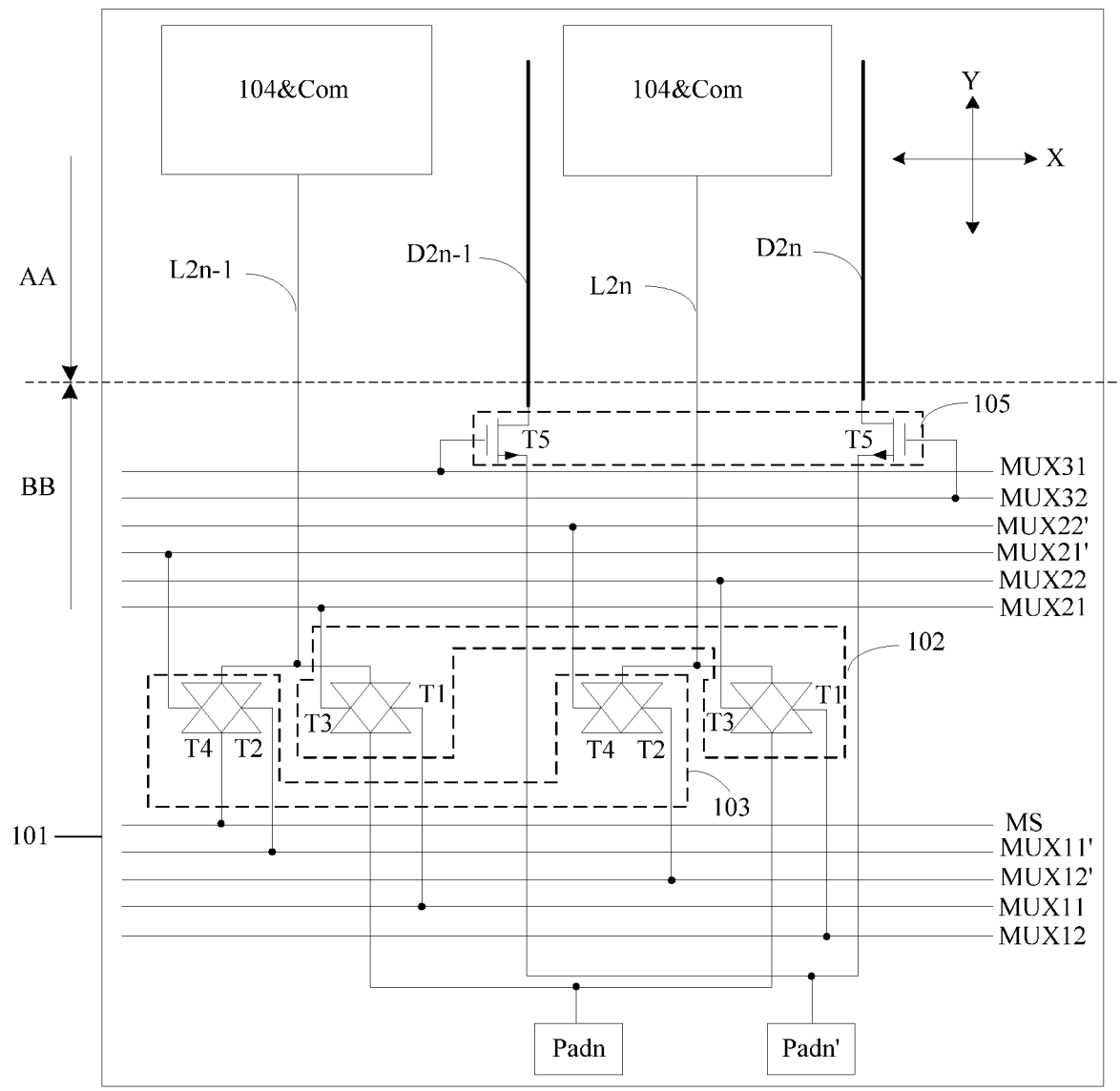
FIG. 22 is a schematic diagram of the structure of a touch selection circuit and a load compensation circuit connected with each other as well as a data selection circuit in FIG. 21.
Figure 23:
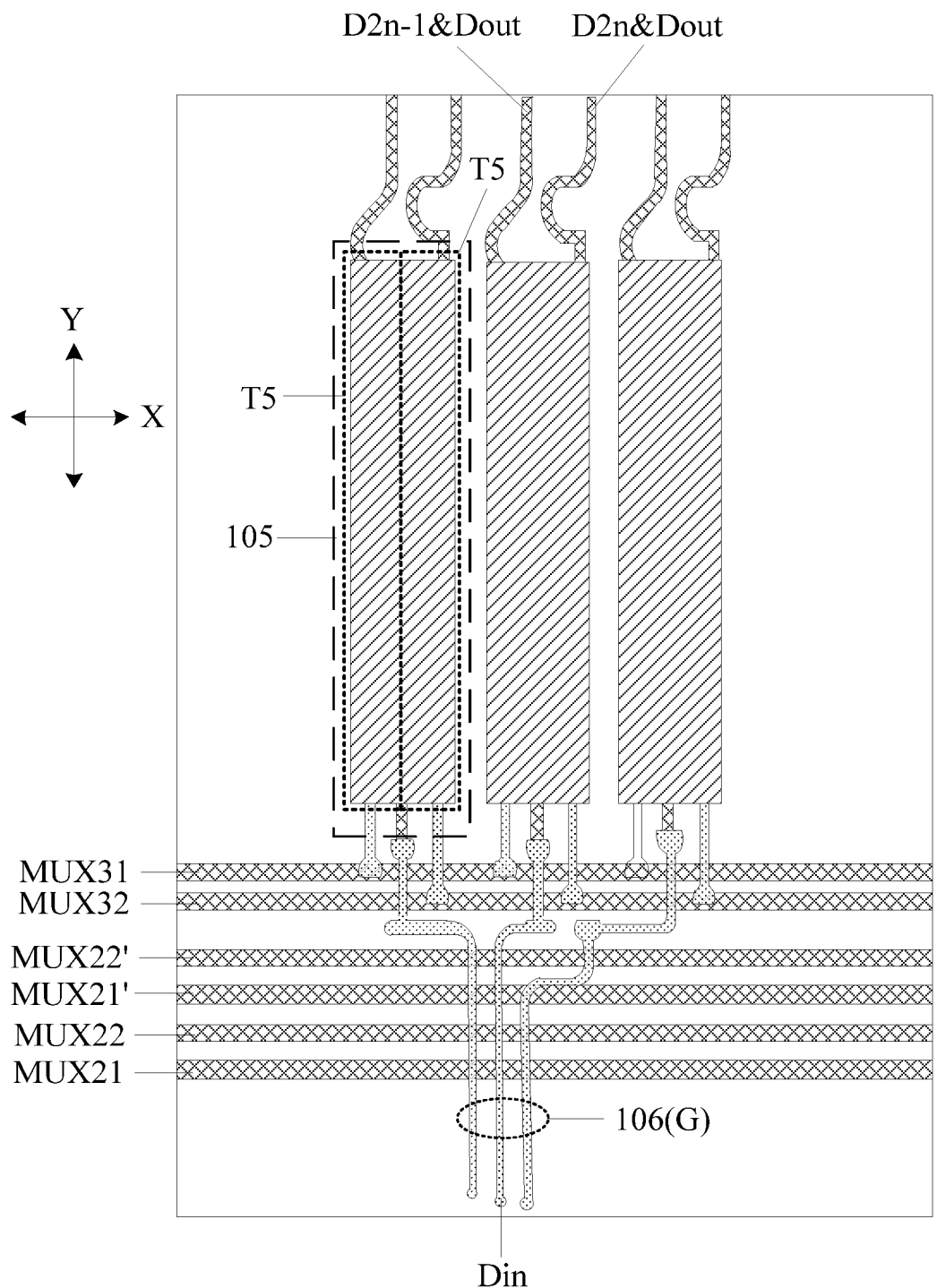
FIG. 23 is layout design of the data selection circuit in FIG. 22.

In some possible implementations, as shown in FIG. 21 to FIG. 23, the display substrate provided by the embodiment of the present disclosure may further include a plurality of data signal lines (D1, D2, D3, . . . ) in the display area AA, and a plurality of groups of data selection circuits 105 and a plurality of data pads (e.g., Pad1', Pad2', . . . ) in the non-display area BB. An extending direction (third direction) of the data signal lines (D1, D2, D3, . . . ) is parallel to an extending direction Y of the touch signal lines (e.g., L1, L2, L3, . . . ). Each group of data selection circuits 105 includes one data input Din and at least two data outputs Dout, the one data input Din is electrically connected with one data pad, and one of the at least two data outputs Dout is electrically connected with at least one of the data signal lines. In this way, data signals provided by one data pad may be provided to the plurality of data signal lines in a time division mode through the data selection circuits 105, so that compared with the technical solution in the related art that data pads and data signal lines are electrically connected in one-to-one correspondence, the number of the data pads can be effectively reduced.

In some possible implementations, as shown in FIG. 21 to FIG. 23, the display substrate provided by the embodiment of the present disclosure may further include at least two fifth control signal lines (e.g., MUX31 and MUX32) in the non-display area BB. Each group of data selection circuits 105 may include: at least two groups of fifth switching transistors T5 (for example, only composed of two fifth switching transistors T5), and one group of fifth switching transistors T5 is electrically connected with at least one of the data signal lines (e.g., D1, D2, D3, . . . ). Optionally, the total number of the fifth control signal lines may be the same as the number of groups of the fifth switching transistors T5 in one group of data selection circuits 105. Specifically, gates of the respective groups of fifth switching transistors T5 are electrically connected with the respective fifth control signal lines (for example, in FIG. 22, the gates of the left group of fifth switching transistors T5 (only including one fifth switching transistor T5) in the data selection circuits 105 are electrically connected with the fifth control signal line MUX31, and the gates of the right group of fifth switching transistors T5 (only including one fifth switching transistor T5) are electrically connected with the fifth control signal line MUX32), first terminals of the respective groups of fifth switching transistors T5 are electrically connected with the respective data signal lines (for example, in FIG. 22, the first terminals of the left group of fifth switching transistors T5 in the data selection circuits 105 are electrically connected with the data signal line $D2n-1$, and the first terminals of the right group of fifth switching transistors T5 are electrically connected with the data signal line $D2n$), and second terminals of all the groups of fifth switching transistors T5 are electrically connected with the one same data pad Padn'. During specific implementation, with the groups where the fifth switching transistors T5 are located as units, by controlling the groups of fifth switching transistors T5 in the data selection circuits 105 to be turned on or off in the time-division mode, data signals provided by the data pads may be provided to the different data signal lines in a time division mode through the turned-on fifth switching transistors T5.

In some possible implementations, in the display substrate provided by the embodiment of the present disclosure, one group of fifth switching transistors T5 only includes one fifth switching transistor T5, or includes at least two fifth switching transistors T5 in parallel. When each group of fifth switching transistors T5 has a plurality of fifth switching transistors T5, an overall on resistance of this group of fifth switching transistors may be effectively lowered.

In some possible implementations, in the display substrate provided by the embodiment of the present disclosure, as shown in FIG. 21 to FIG. 23, all the fifth control signal lines (e.g., MUX31 and MUX32) extend in the vertical direction X of the touch signal lines (e.g., L1, L2, L3, . . . ), and all the fifth control signal lines (e.g., MUX31 and MUX32) are between the plurality of groups of data selection circuits 105 and the plurality of groups of touch selection circuits 102, so that the fifth control signal lines (e.g., MUX31 and MUX32) may be adjacent to the plurality of groups of data selection circuits 105, facilitating reduction of losses of control signals on the fifth control signal lines on transmission paths, and improving the authenticity of the control signals.

In some possible implementations, as shown in FIG. 7, FIG. 11, FIG. 15 and FIG. 23, the display substrate provided by the embodiment of the present disclosure may further include a plurality of connection lines 106 in the non-display area BB. The data input is electrically connected with the respective data pad (e.g., Padn') through one of the connection lines 106. Optionally, in the load compensation circuits 103 and the touch selection circuits 102 connected with each other, the touch selection circuits 102 include internal gaps G (e.g., a gap between two first switching transistors T1), and the load compensation circuits 103 are on two sides, along the extending direction Y of the touch signal lines (e.g., $L2n-1$, $L2n$, . . . ), of the touch selection circuits 102 (for example, two second switching transistors T2 are on a left side and a right side of the two first switching transistors T1 respectively); and every three of the connection lines 106 are one group, and one group of connection lines 106 penetrates through one of the internal gaps G.

It should be noted that, as shown in FIG. 15, when the touch selection circuits 102 include the first switching transistors T1, the second switching transistors T2, the third switching transistors T3 and the fourth switching transistors T4, in one group of touch selection circuits 102, a distance between the adjacent first switching transistors T1 may be greater than a distance between the adjacent third switching transistors T3; and one group of connection lines 106 has bending portions between the adjacent first switching transistors T1 in the group of touch selection circuits 102, and the bending portions are used to avoid leads of the touch inputs Tin so as to prevent short circuiting between the connection lines 106 and the leads of the touch inputs Tin.

Figure 24:
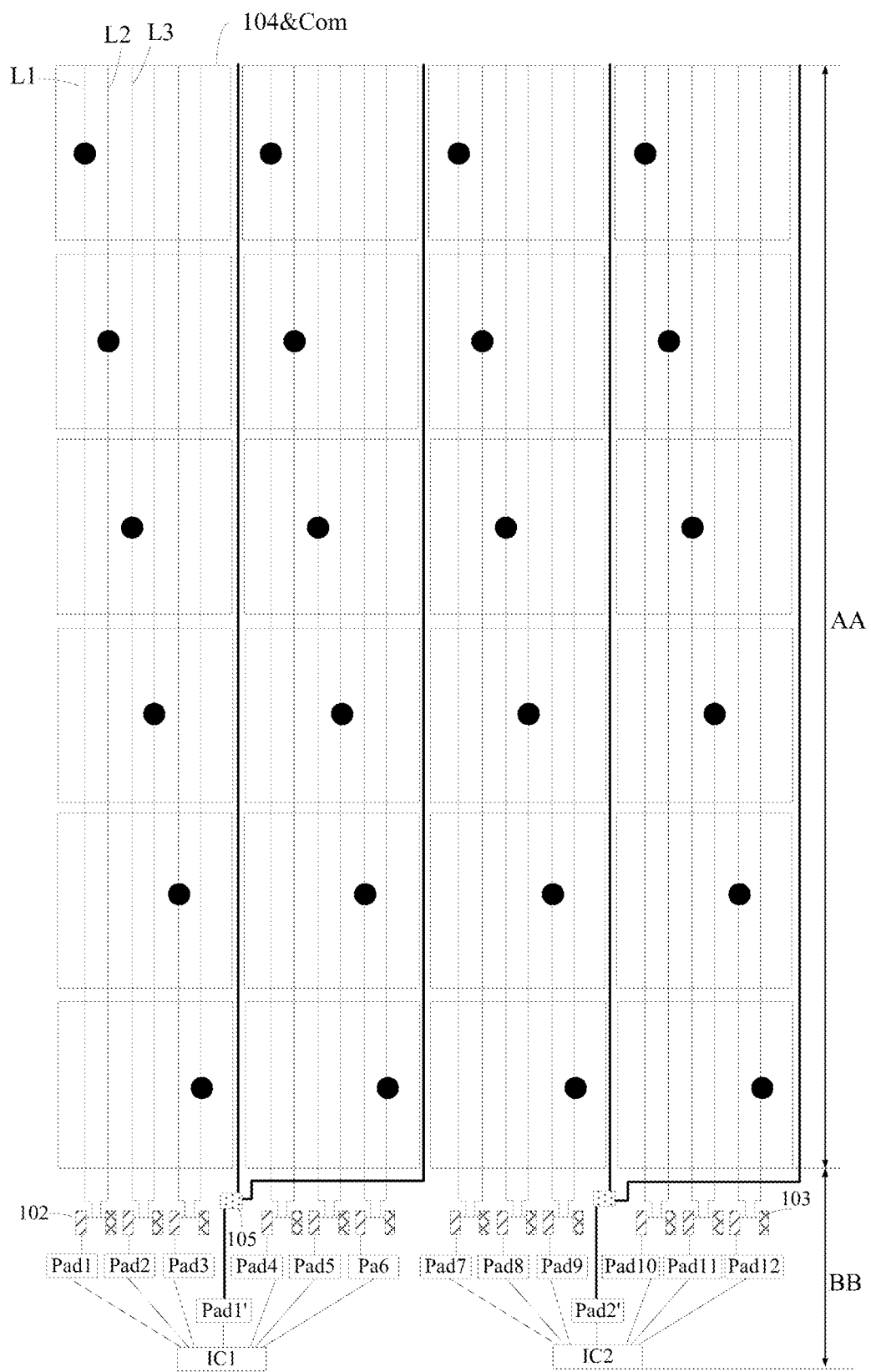
FIG. 24 is a schematic diagram of another structure of a display substrate provided by an embodiment of the present disclosure.
Figure 25:
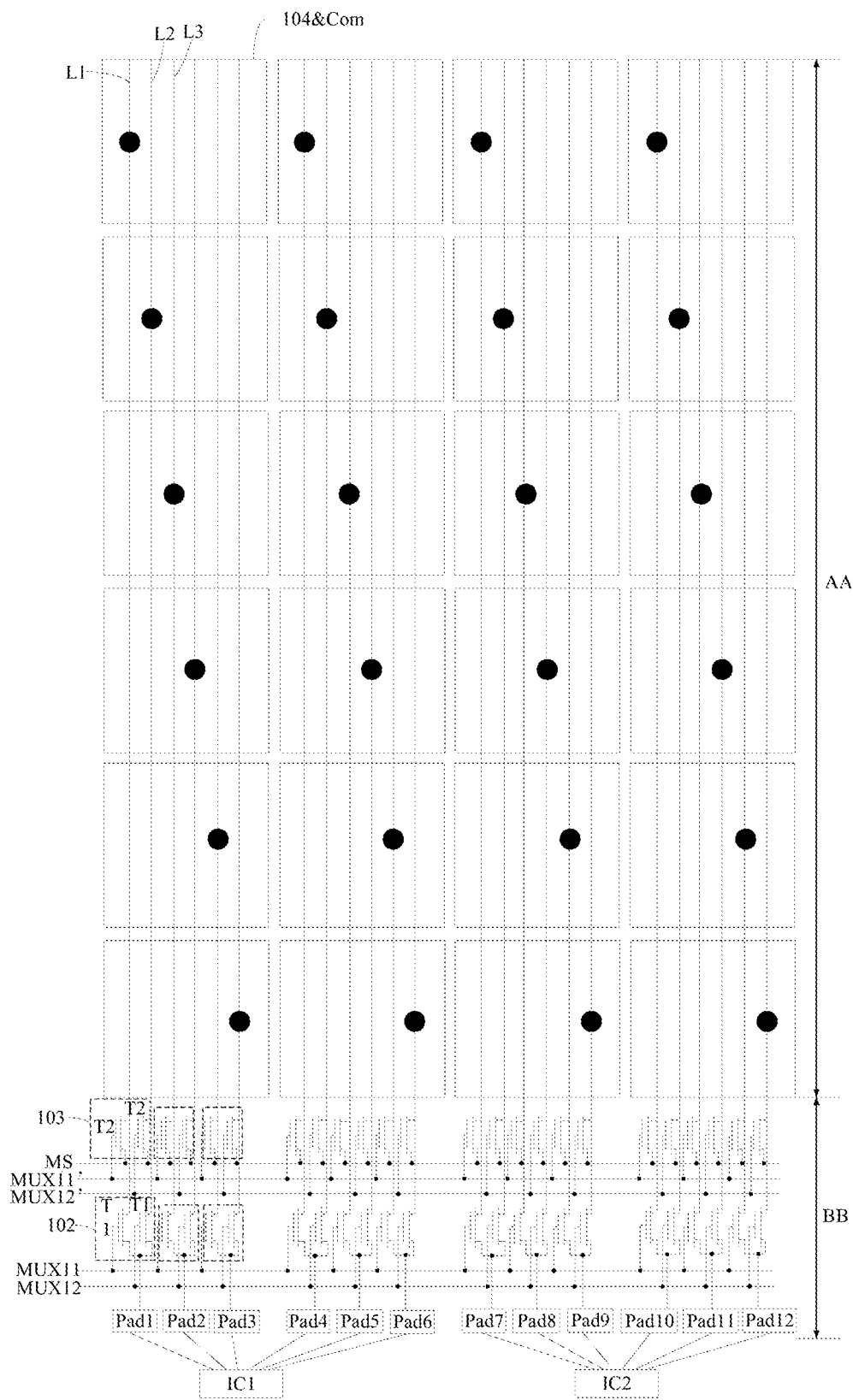
FIG. 25 is a schematic diagram of another structure of a display substrate provided by an embodiment of the present disclosure.
Figure 26:
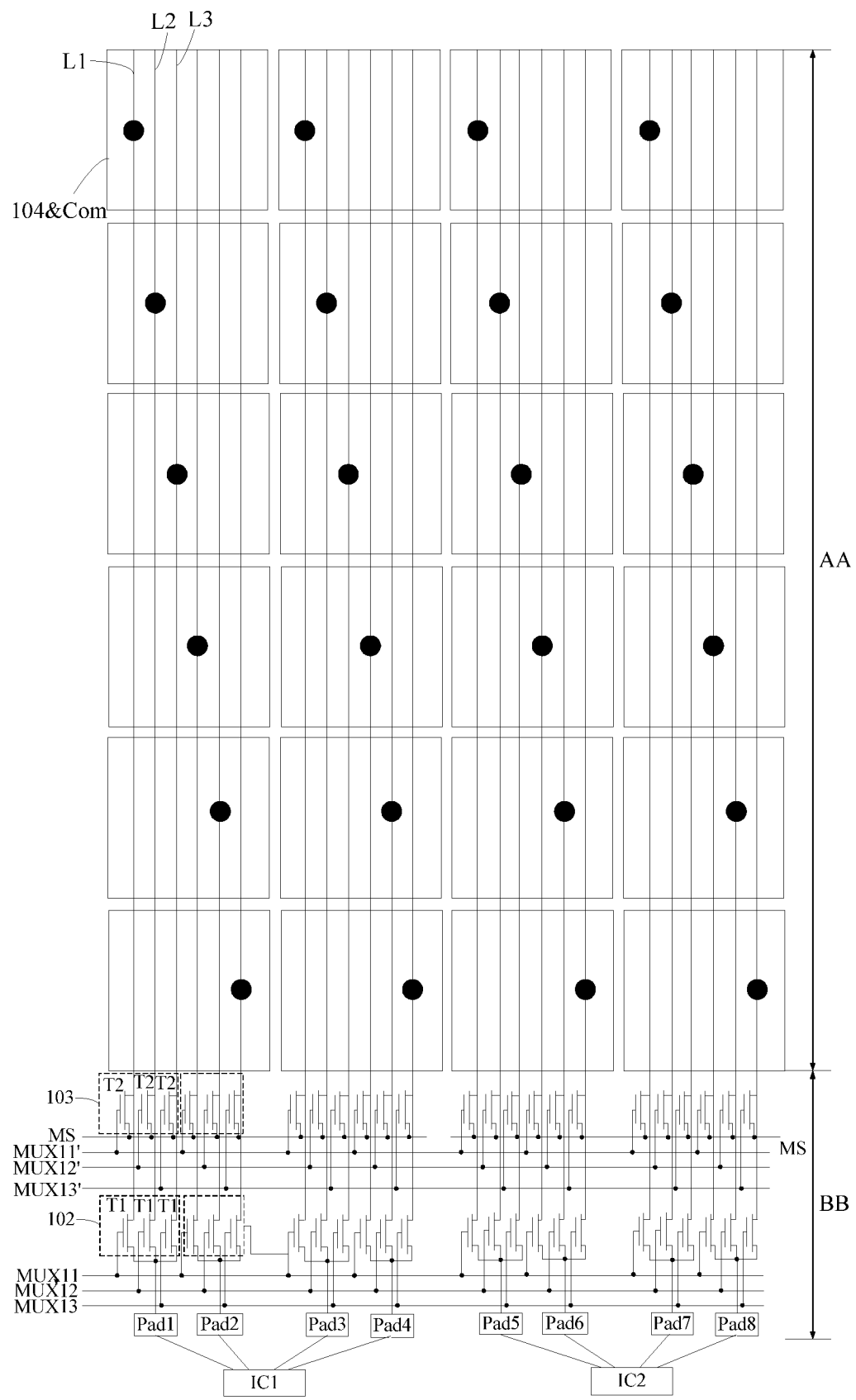
FIG. 26 is a schematic diagram of another structure of a display substrate provided by an embodiment of the present disclosure.

In some possible implementations, as shown in FIG. 24 to FIG. 26, the display substrate provided by the embodiment of the present disclosure may further include a first driving chip IC1 and a second driving chip IC2 in the non-display area BB. A first part (e.g., a half) of the touch pads (e.g., Pad1, Pad2, Pad3, Pad4, Pad5 and Pad6 in FIGS. 24 and 25, or Pad1, Pad2, Pad3 and Pad4 in FIG. 26) serially arranged in the vertical direction X of the touch signal lines (e.g., L1, L2, L3, . . . ) are electrically connected with the first driving chip IC1, a second part (e.g., another half) of the touch pads (e.g., Pad7, Pad8, Pad9, Pad10, Pad11 and Pad12 in FIGS. 24 and 25, or Pad5, Pad6, Pad7 and Pad8 in FIG. 26) serially arranged in the vertical direction X are electrically connected with the second driving chip IC2, a first part (e.g., a half) of the data pads (e.g., Pad1' in FIG. 24) serially arranged in the vertical direction X of the touch signal lines (e.g., L1, L2, L3, . . . ) are electrically connected with the first driving chip IC1, and a second part (e.g., another half) of the data pads (e.g., Pad2' in FIG. 24) serially arranged in the vertical direction X are electrically connected with the second driving chip IC2. Of course, during specific implementation, the number of the touch pads and the number of the data pads in the display substrate are not limited to the numbers illustrated in FIG. 24 to FIG. 26, and FIG. 24 to FIG. 26 are only used to explain the present disclosure.

The driving principle of the display substrate shown in FIG. 6, FIG. 17, FIG. 18 and FIG. 22 provided by the embodiment of the present disclosure is explained in detail below through specific embodiments. Corresponding circuit control timing diagrams are as shown in FIG. 27 to FIG. 30 respectively. All the first switching transistors T1 and the second switching transistors T2 in FIG. 6, FIG. 17, FIG. 18 and FIG. 22 are N type transistors, and all the third switching transistors T3 and the fourth switching transistors T4 in FIG. 22 are P type transistors. The embodiment of the present disclosure is described by taking an example that the non-display area includes the first driving chip IC1 and the second driving chip IC2.

Figure 27:
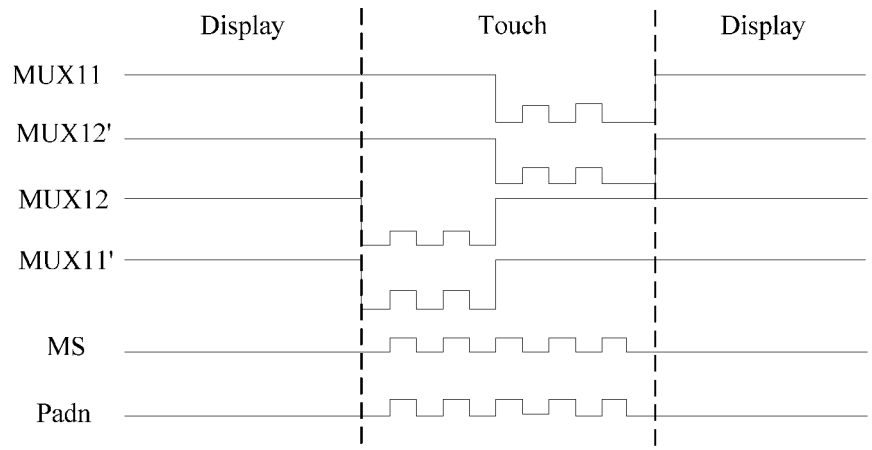
FIG. 27 is a circuit timing diagram of the display substrate shown in FIG. 6, FIG. 9 and FIG. 10.

For the display substrate shown in FIG. 6, its driving timing is as shown in FIG. 27. In a display stage, the first control signal lines (e.g., MUX11 and MUX 12) and the second control signal lines (MUX11' and MUX12') provide high-level signals, all the first switching transistors T1 are turned on under the control of the high-level signals of the first control signal lines (e.g., MUX11 and MUX 12), and all the second switching transistors T2 are turned on under the control of the high-level signals of the second control signal lines (MUX11' and MUX 12'). The compensation signal line MS and the touch pads (e.g., Pad1, Pad2, Pad3, . . . ) provide common electrode signals (Vcom) at the same time, so that the common electrode signals (Vcom) of the compensation signal line MS are provided to the common electrode blocks com (i.e., touch electrodes 104) through the turned-on second switching transistors T2 and the touch signal lines (e.g., L1, L2, L3, . . . ), and the common electrode signals (Vcom) of the touch pads (e.g., Pad1, Pad2, Pad3, . . . ) are provided to the common electrode blocks com (i.e., touch electrodes 104) through the turned-on first switching transistors T1 and the touch signal lines (e.g., L1, L2, L3, . . . ), thereby achieving the display function. A driving manner in a touch stage (Touch) in FIG. 6 and FIG. 27 is the same as that in a touch stage (Touch) in FIG. 17 and FIG. 28, see the following specifically.

Figure 28:
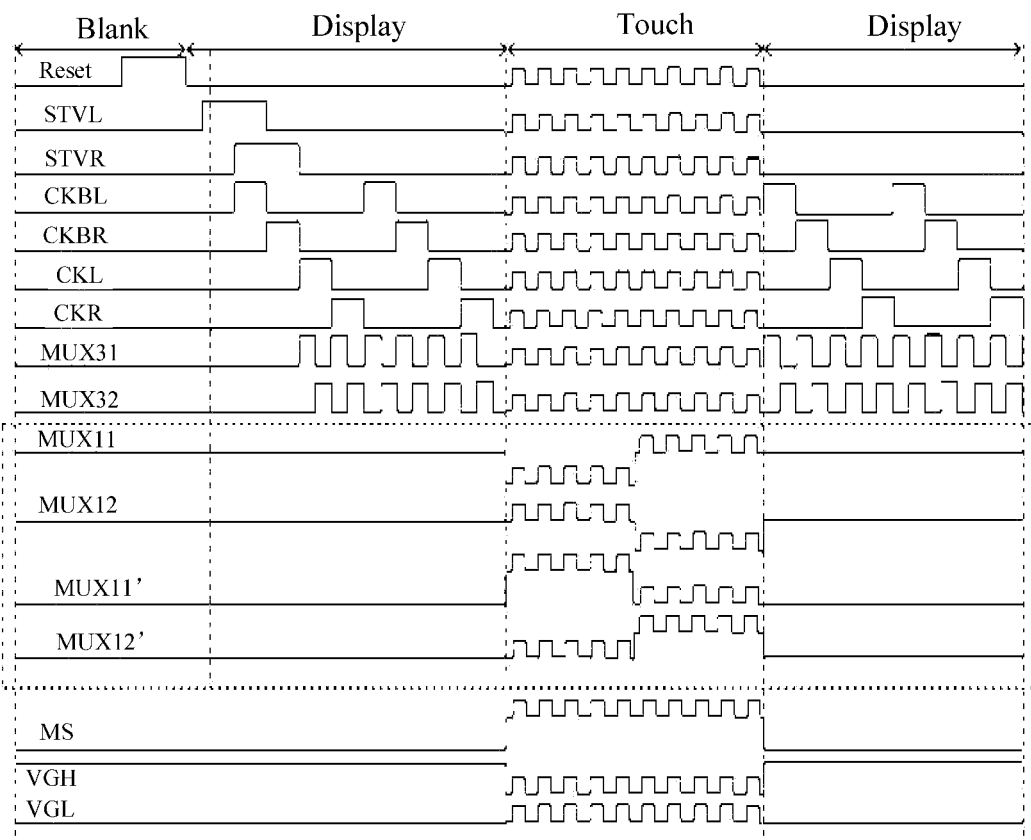
FIG. 28 is a circuit timing diagram of the display substrate shown in FIG. 17 and FIG. 19.

For the display substrate shown in FIG. 17, its driving timing is as shown in FIG. 28. Specifically, in a blank stage (Blank), a reset signal end Reset performs resetting. In the display stage (display), frame trigger ends (STVL and STVR) sequentially input start trigger signals, clock signal ends (CKBL, CKBR, CKL and CKR) sequentially input clock signals, signals of power signal ends (VGH and VGL) are used for cooperating to scan gate lines row by row, and the selection circuit (MUX31 and MUX32 control the working of the data selection circuits 105) electrically connected with the data signal lines (e.g., D1, D2, D3, . . . ) sequentially loads the data signals to the data signal lines to realize the display of an image. Specifically see the working conditions of the switching transistors in FIG. 6 and FIG. 27, which is omitted here.

Continuing referring to FIGS. 17 and 28, the touch stage (Touch) may be divided into two time periods. In the first time period: the first control signal line MUX11 is for low-level signals, and the first switching transistors T1 electrically connected with odd-numbered touch signal lines are all off; the first control signal line MUX12 is for high-level signals, and the first switching transistors T1 electrically connected with even-numbered touch signal lines are all on; the second control signal line MUX11' is for high-level signals, and the second switching transistors T2 electrically connected with odd-numbered touch signal lines are all on; the second control signal line MUX12' is for low-level signals, and the second switching transistors T2 electrically connected with even-numbered touch signal lines are all off; and the touch selection circuits 102 load the touch signals to the electrically connected even-numbered touch signal lines (L2, L4, L6, . . . ) through the corresponding touch pads (Pad1, Pad2, Pad3, . . . ), and the load compensation circuits 103 load the compensation signals to the electrically connected odd-numbered touch signal lines (L1, L3, L5, . . . ) through the compensation signal line MS. In the second time period: the first control signal line MUX11 is for high-level signals, and the first switching transistors T1 electrically connected with odd-numbered touch signal lines are all on; the first control signal line MUX12 is for low-level signals, and the first switching transistors T1 electrically connected with even-numbered touch signal lines are all off; the second control signal line MUX11' is for low-level signals, and the second switching transistors T2 electrically connected with odd-numbered touch signal lines are all off; the second control signal line MUX12' is for high-level signals, and the second switching transistors T2 electrically connected with even-numbered touch signal lines are all on; and the touch selection circuits 102 load the touch signals to the electrically connected odd-numbered touch signal lines (L1, L3, L5, . . . ) through the corresponding touch pads (Pad1, Pad2, Pad3, . . . ), and the load compensation circuits 103 load the compensation signals to the electrically connected even-numbered touch signal lines (L2, L4, L6, . . . ) through the compensation signal line MS.

Figure 31:
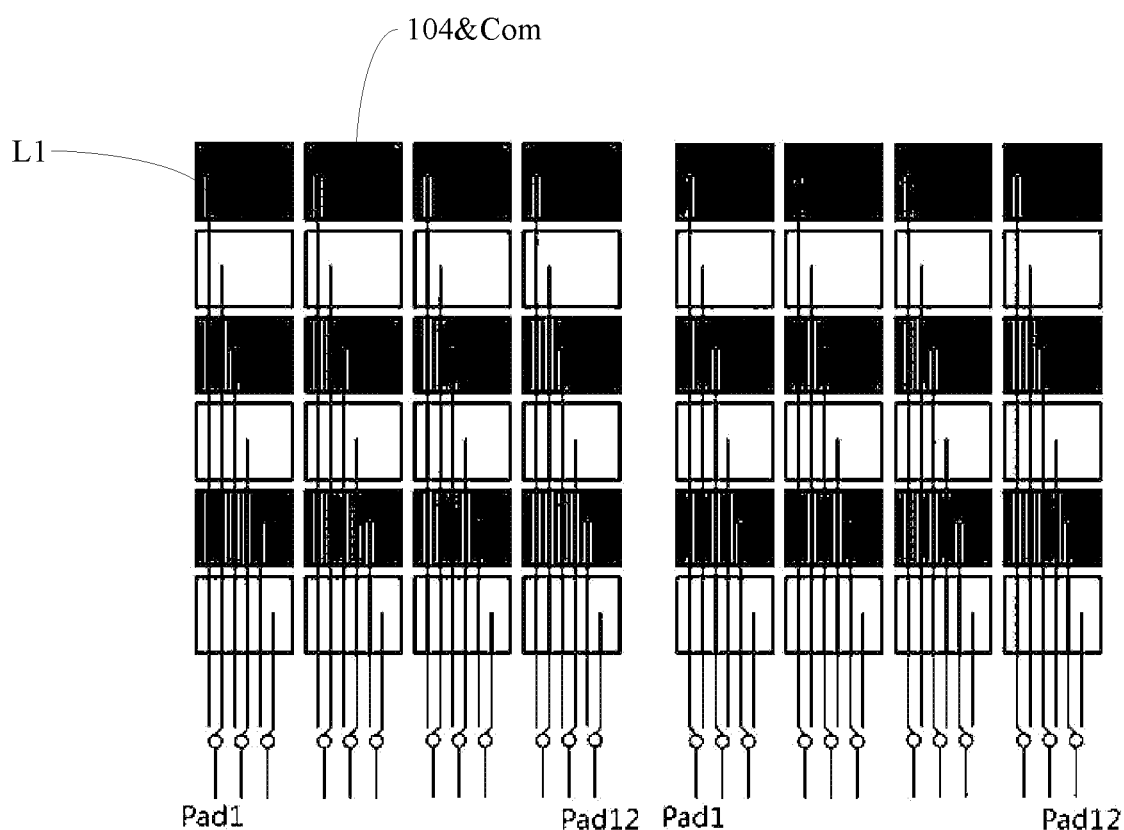
FIGS. 31 and 32 are schematic diagrams of the driving principle of touch electrodes corresponding to FIG. 28.

Specifically, as shown in FIG. 31, FIG. 31 is a schematic diagram of the principle of loading the touch signals to all the touch electrodes 104 in the display area as shown in FIGS. 17 and 28. In FIG. 31, the left half part (left four columns) is a schematic diagram of loading the touch signals to the touch electrodes in even-numbered rows by the touch pads, and the right half part (right four columns) is a schematic diagram of loading the touch signals to the touch electrodes in odd-numbered rows by the touch pads. Of course, during specific implementation, the number of the touch electrodes 104 is far more than the number shown in FIG. 31. Taking the touch electrodes 104 in four columns and six rows of the left half part in FIG. 31 as an example (equivalent to FIG. 17): in the first time period of touch, an analog front end (AFE) in the first driving chip IC1 loads the touch signals to the touch electrodes 104 in the even-numbered rows in the left two columns in the left half part in FIG. 31, an AFE in the second driving chip IC2 loads the touch signals to the touch electrodes 104 in the even-numbered rows in the right two columns in the left half part in FIG. 31, and the compensation signal line MS loads the compensation signals to the touch electrodes 104 in the odd-numbered rows through the second switching transistors T2 corresponding to the touch electrodes 104 in the odd-numbered rows. In the second time period of touch, the AFEs in the first driving chip IC1 and the second driving chip IC2 respectively load the touch signals to the touch electrodes 104 in the odd-numbered rows in the left two columns and the right two columns in the left half part which are not processed in the first time period, and the compensation signal line MS loads the compensation signals to the touch electrodes 104 in the even-numbered rows through the second switching transistors T2 corresponding to the touch electrodes 104 in the even-numbered rows.

Figure 32:
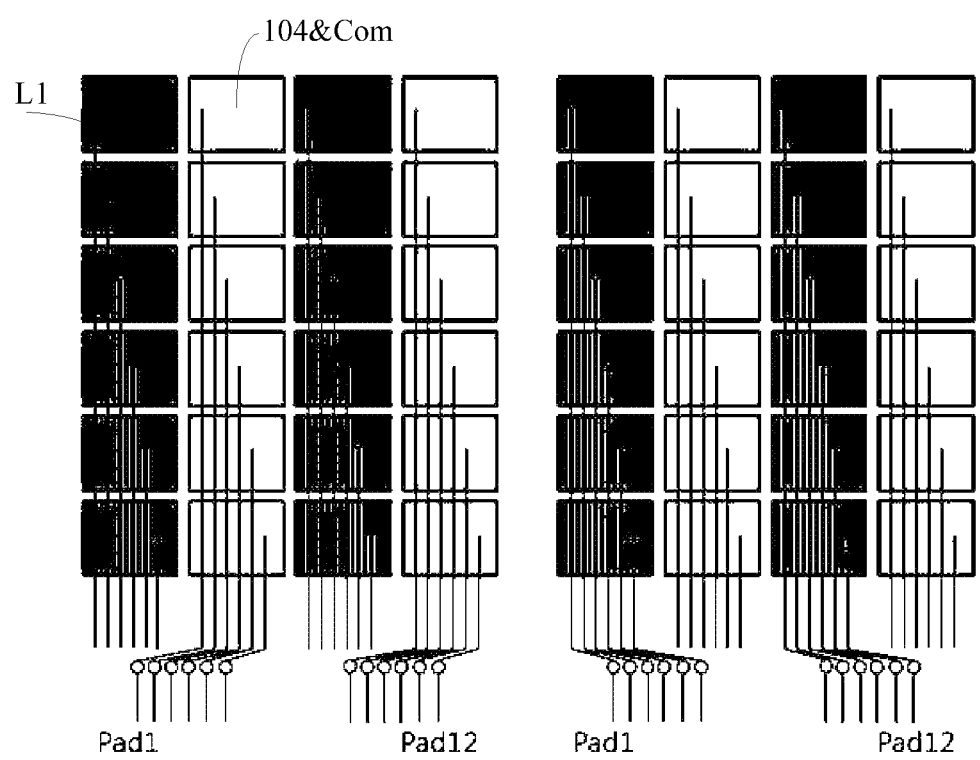

During specific implementation, the structure as shown in FIG. 17 is illustrated by taking an example in which two touch electrodes 104 correspondingly electrically connected with one touch pad are in the same column. Of course, two touch electrodes 104 correspondingly electrically connected with one touch pad may also be in the same row, and the touch signals are loaded every other column. Specifically, as shown in FIG. 32, FIG. 32 is a schematic diagram of another effect of loading the touch signals to the touch electrodes 104 corresponding to the timing diagram shown in FIG. 28 in which when the two touch electrodes 104 correspondingly electrically connected with one touch pad may also be in the same row, the spaced touch signal lines may also be connected by a bridge or a jumper. In FIG. 32, the left half part (left four columns) is a schematic diagram of loading the touch signals to the touch electrodes in even-numbered columns by the touch pads, and the right half part (right four columns) is a schematic diagram of loading the touch signals to the touch electrodes in odd-numbered columns by the touch pads. That is, in the first time period of touch, the AFE in the first driving chip IC1 loads the touch signals to the touch electrodes 104 in the even-numbered columns in the left two columns in the left half part in FIG. 32, the AFE in the second driving chip IC2 loads the touch signals to the touch electrodes 104 in the even-numbered columns in the right two columns in the left half part in FIG. 32, and the compensation signal line MS loads the compensation signals to the touch electrodes 104 in the odd-numbered columns through the second switching transistors T2 corresponding to the touch electrodes 104 in the odd-numbered columns. In the second time period of touch, the AFEs in the first driving chip IC1 and the second driving chip IC2 respectively load the touch signals to the touch electrodes 104 in the odd-numbered columns in the left two columns and the right two columns in the left half part which are not processed in the first time period, and the compensation signal line MS loads the compensation signals to the touch electrodes 104 in the even-numbered columns through the second switching transistors T2 corresponding to the touch electrodes 104 in the even-numbered columns.

Figure 29:
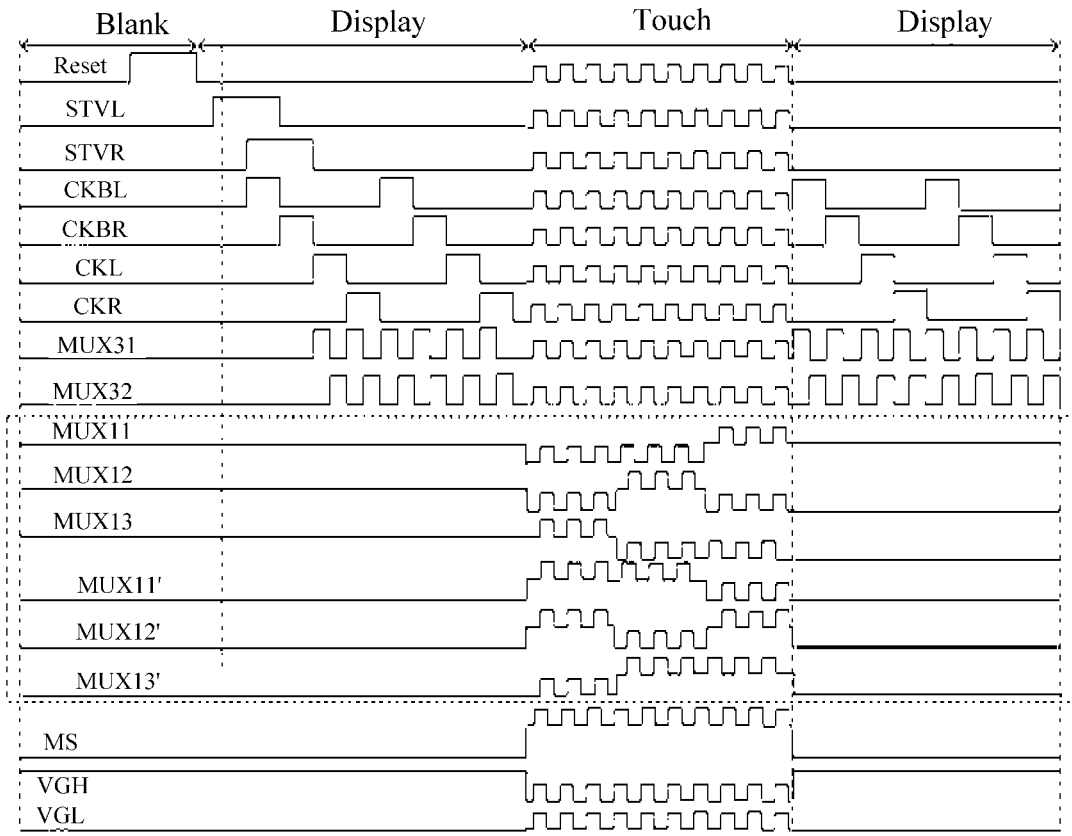
FIG. 29 is a circuit timing diagram of the display substrate shown in FIG. 18 and FIG. 20.

For the display substrate shown in FIG. 18, its driving timing is as shown in FIG. 29. Specifically, the difference between this embodiment and FIGS. 17 and 28 is that: in FIGS. 17 and 28, one touch pad is electrically connected with two touch signal lines, and in FIGS. 18 and 29, one touch pad is electrically connected with three touch signal lines. Specifically, the working manner in the display stage (display) is the same as that in FIG. 28, which is omitted here.

Continuing referring to FIGS. 18 and 19, the touch stage (Touch) is divided into three time periods, and in the first time period: the first control signal lines MUX11 and MUX12 are both for low-level signals, and the first two of the first switching transistors T1 from the left in each touch selection circuit 102 are both off; the first control signal line MUX13 is for high-level signals, and the third one of the first switching transistors T1 from the left in each touch selection circuit 102 is on; the second control signal lines MUX11' and MUX12' are for high-level signals, and the first two of the second switching transistors T2 from the left in each load compensation circuit 103 are all on; the second control signal line MUX13' is for low-level signals, and the third one of the second switching transistors T2 from the left in each load compensation circuit 103 is off; and the touch selection circuits 102 load the touch signals to the electrically connected touch signal lines (L3, L6, . . . ) through the third one of the first switching transistors T1 from the left by the corresponding touch pads (Pad1, Pad2, Pad3, . . . ), and the load compensation circuits 103 load the compensation signals to the electrically connected touch signal lines (L1, L2, L4, L5, . . . ) through the first two of the second switching transistors T2 from the left. In the second time period: the first control signal lines MUX11 and MUX13 are both for low-level signals, and the first one and the third one of the first switching transistors T1 from the left in each touch selection circuit 102 are both off; the first control signal line MUX12 is for high-level signals, and the second one of the first switching transistors T1 from the left in each touch selection circuit 102 is on; the second control signal lines MUX11' and MUX13' are for high-level signals, and the first one and the third one of the second switching transistors T2 from the left in each load compensation circuit 103 are both on; the second control signal line MUX12' is for low-level signals, and the second one of the second switching transistors T2 from the left in each load compensation circuit 103 is off; and the touch selection circuits 102 load the touch signals to the electrically connected touch signal lines (L2, L5, . . . ) through the second one of the first switching transistors T1 from the left by the corresponding touch pads (Pad1, Pad2, Pad3, . . . ), and the load compensation circuits 103 load the compensation signals to the electrically connected touch signal lines (L1, L3, L4, L6, . . . ) through the first one and the third one of the second switching transistors T2 from the left. In the third time period: the first control signal line MUX11 is for high-level signals, and the first one of the first switching transistors T1 from the left in each touch selection circuit 102 is on; the first control signal lines MUX12 and MUX13 are for low-level signals, and the second one and the third one of the first switching transistors T1 from the left in each touch selection circuit 102 are both off; the second control signal line MUX11' is for low-level signals, and the first one of the second switching transistors T2 from the left in each load compensation circuit 103 is off; the second control signal lines MUX12' and MUX13' are for high-level signals, and the second one and the third one of the second switching transistors T2 from the left in each load compensation circuit 103 are both on; and the touch selection circuits 102 load the touch signals to the electrically connected touch signal lines (L1, L4, . . . ) through the first one of the first switching transistors T1 from the left by the corresponding touch pads (Pad1, Pad2, Pad3, . . . ), and the load compensation circuits 103 load the compensation signals to the electrically connected touch signal lines (L2, L3, L5, L6, . . . ) through the second one and the third one of the second switching transistors T2 from the left.

Figure 33:
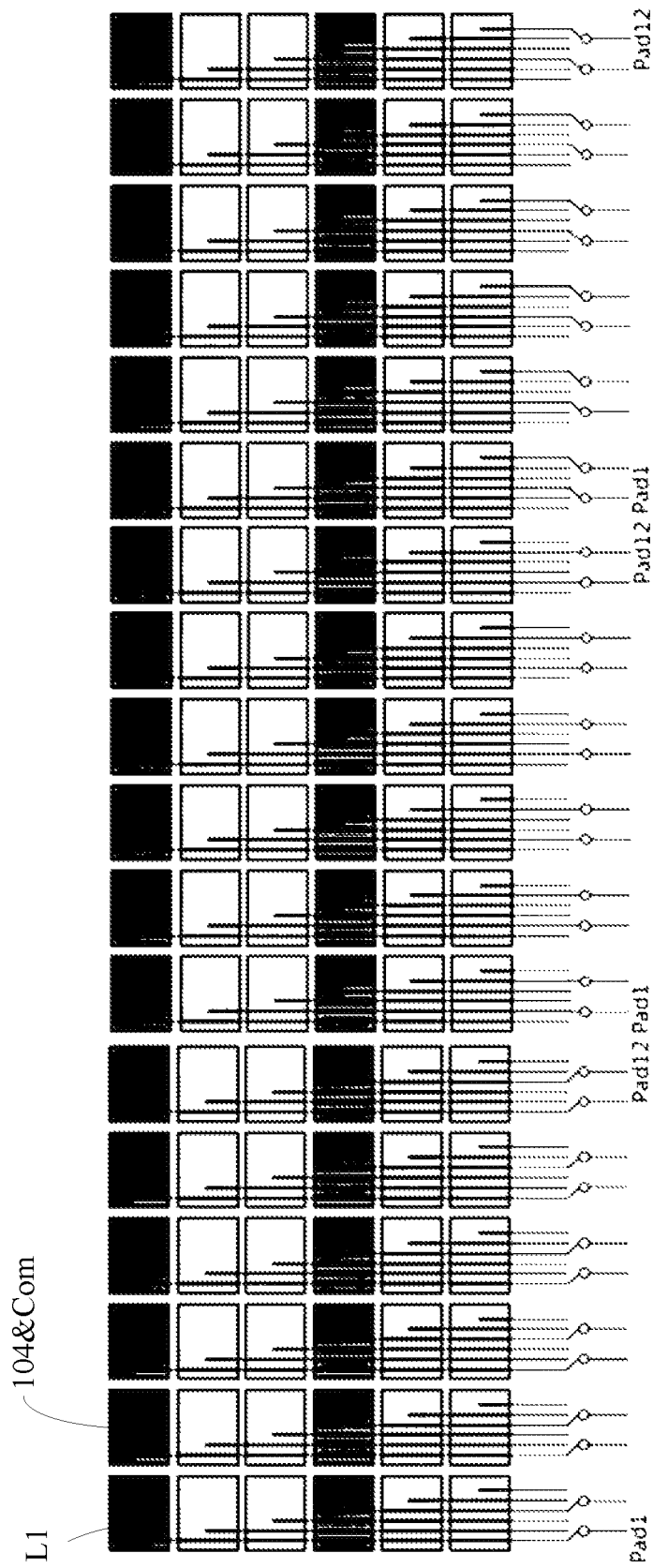
FIGS. 33 and 34 are schematic diagrams of the driving principle of touch electrodes corresponding to FIG. 29.

Specifically, as shown in FIG. 33, FIG. 33 is a schematic diagram corresponding to the effect of loading the touch signals to all the touch electrodes 104 in the display area AA as shown in FIGS. 18 and 29. In FIG. 33, the left half part (the touch electrodes corresponding to Pad1 to Pad12 in Columns 1 to 6 from the left) is a schematic diagram of loading the touch signals to the touch electrodes in the first row, the fourth row, the seventh row . . . by the touch pads, the middle part (the touch electrodes corresponding to Pad1 to Pad12 in Columns 7 to 12 from the left) is a schematic diagram of loading the touch signals to the touch electrodes in the second row, the fifth row, the eighth row . . . by the touch pads, and the right half part (the touch electrodes corresponding to Pad1 to Pad12 in Columns 13 to 18 from the left) is a schematic diagram of loading the touch signals to the touch electrodes in the third row, the sixth row, the ninth row . . . by the touch pads. It should be noted that, FIG. 18 is only an example in which the display area includes six columns and six rows of touch electrodes 104 in FIG. 33. Of course, during specific implementation, the number of the touch electrodes 104 is far more than the number shown in FIG. 33. Taking the touch electrodes 104 in four columns and six rows of the left half part in FIG. 33 as an example (equivalent to FIG. 18): in the first time period of touch, the AFE in the first driving chip IC1 loads the touch signals to the touch electrodes in the first row, the fourth row . . . in Columns 1 to 3 in Columns 1 to 6 from the left in FIG. 33, the AFE in the second driving chip IC2 loads the touch signals to the touch electrodes in the first row, the fourth row . . . in Columns 4 to 6 in Columns 1 to 6 from the left in FIG. 33, and the compensation signal line MS loads the compensation signals to the touch electrodes 104 in the second row, the third row, the fifth row, the sixth row . . . in Columns 1 to 6 from the left in FIG. 33. In the second time period of touch, the AFEs in the first driving chip IC1 and the second driving chip IC2 respectively load the touch signals to the touch electrodes 104 in the second row, the fifth row . . . in Columns 1 to 3 and Columns 4 to 6 in Columns 1 to 6 from the left which are not processed in the first time period, and the compensation signal line MS loads the compensation signals to the touch electrodes 104 in the first row, the third row, the fourth row, the sixth row . . . in Columns 1 to 6 from the left in FIG. 33. In the third time period of touch, the AFEs in the first driving chip IC1 and the second driving chip IC2 respectively load the touch signals to the touch electrodes 104 in the third row, the sixth row . . . in Columns 1 to 3 and Columns 4 to 6 in Columns 1 to 6 from the left which are not processed in the first time period and in the second time period, and the compensation signal line MS loads the compensation signals to the touch electrodes 104 in the first row, the second row, the fourth row, the fifth row . . . in Columns 1 to 6 from the left in FIG. 33.

Figure 34:
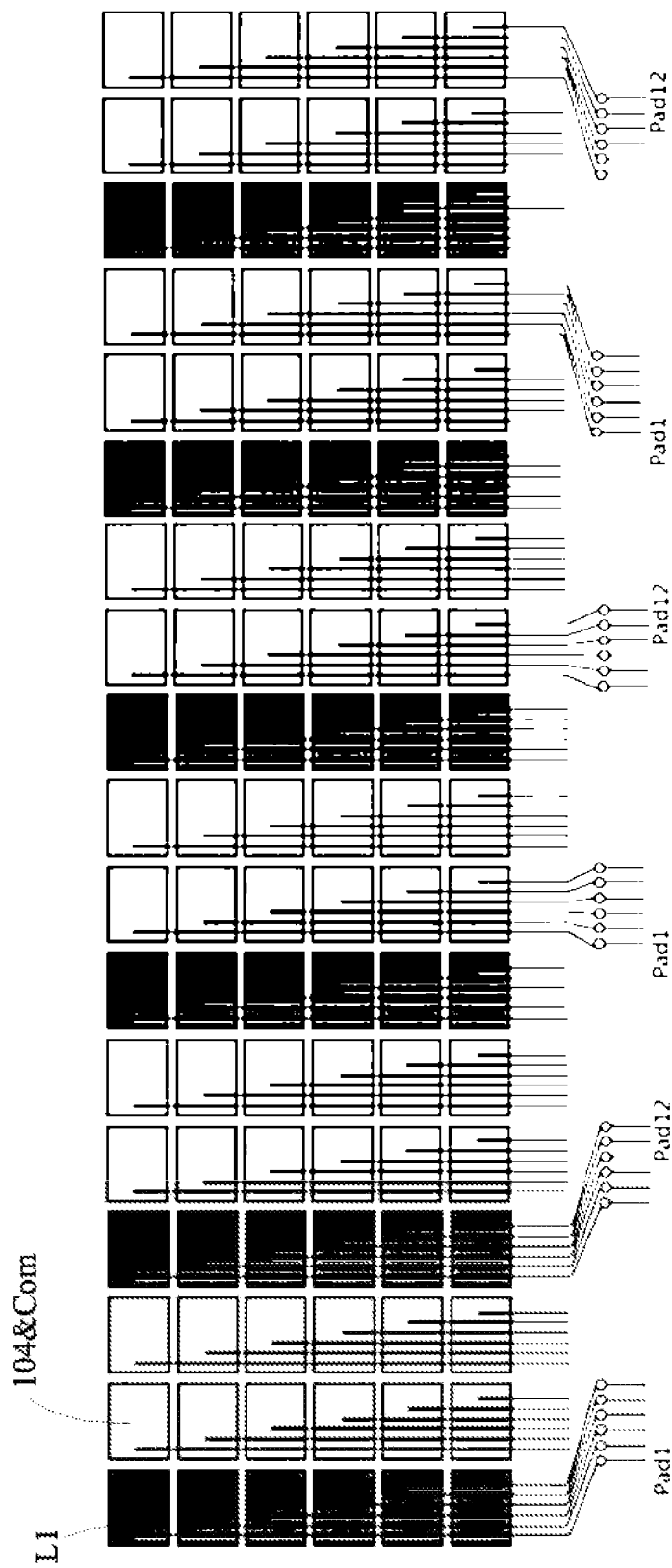

During specific implementation, the structure as shown in FIG. 18 is illustrated by taking an example in which three touch electrodes 104 correspondingly electrically connected with one touch pad are in the same column. Of course, the three touch electrodes 104 correspondingly electrically connected with one touch pad may also be in the same row, and the touch signals are loaded every other column. Specifically, as shown in FIG. 34, FIG. 34 is a schematic diagram of another effect of loading the touch signals to the touch electrodes 104 corresponding to the timing diagram shown in FIG. 28 in which when the three touch electrodes 104 correspondingly electrically connected with one touch pad may also be in the same row, the spaced touch signal lines may also be connected by a bridge or a jumper. In FIG. 34, the left half part (the touch electrodes corresponding to Pad1 to Pad12 in Columns 1 to 6 from the left) is a schematic diagram of loading the touch signals to the touch electrodes in the first column, the fourth column, the seventh column . . . by the touch pads, the middle part (the touch electrodes corresponding to Pad1 to Pad12 in Columns 7 to 12 from the left) is a schematic diagram of loading the touch signals to the touch electrodes in the second column, the fifth column, the eighth column . . . by the touch pads, and the right half part (the touch electrodes corresponding to Pad1 to Pad12 in Columns 13 to 18 from the left) is a schematic diagram of loading the touch signals to the touch electrodes in the third column, the sixth column, the ninth column . . . by the touch pads. That is, in the first time period of touch, the AFE in the first driving chip IC1 loads the touch signals to the touch electrodes in the first column, the fourth column . . . in Columns 1 to 3 in Columns 1 to 6 from the left in FIG. 34, the AFE in the second driving chip IC2 loads the touch signals to the touch electrodes in the first column, the fourth column . . . in Columns 4 to 6 in Columns 1 to 6 from the left in FIG. 34, and the compensation signal line MS loads the compensation signals to the touch electrodes 104 in the second column, the third column, the fifth column, the sixth column . . . in Columns 1 to 6 from the left in FIG. 18. In the second time period of touch, the AFEs in the first driving chip IC1 and the second driving chip IC2 respectively load the touch signals to the touch electrodes 104 in the second column, the fifth column . . . in Columns 1 to 3 and Columns 4 to 6 in Columns 1 to 6 from the left which are not processed in the first time period, and the compensation signal line MS loads the compensation signals to the touch electrodes 104 in the first column, the third column, the fourth column, the sixth column . . . in Columns 1 to 6 from the left in FIG. 34. In the third time period of touch, the AFEs in the first driving chip IC1 and the second driving chip IC2 respectively load the touch signals to the touch electrodes 104 in the third column, the sixth column . . . in Columns 1 to 3 and Columns 4 to 6 in Columns 1 to 6 from the left which are not processed in the first time period and in the second time period, and the compensation signal line MS loads the compensation signals to the touch electrodes 104 in the first column, the second column, the fourth column, the fifth column . . . in Columns 1 to 6 from the left in FIG. 34.

Figure 30:
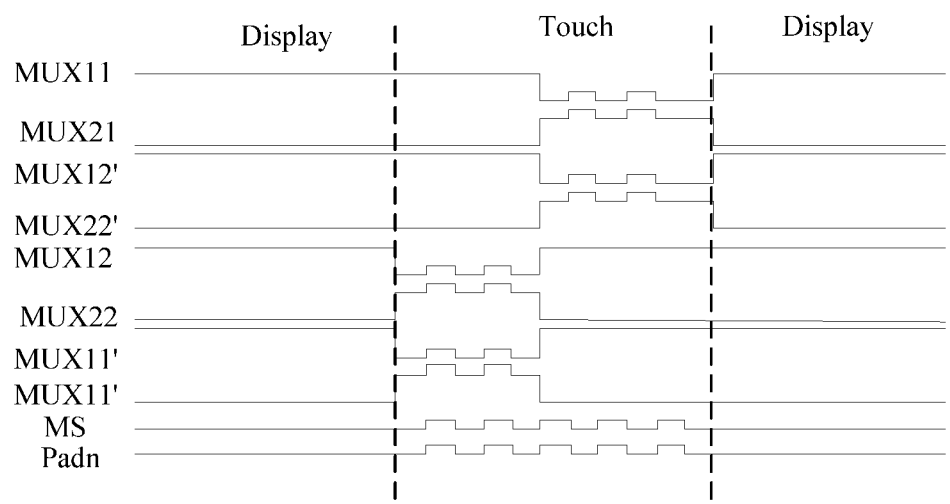
FIG. 30 is a circuit timing diagram of the display substrate shown in FIG. 14.

For the display substrate shown in FIG. 22, its driving timing is as shown in FIG. 30. The difference between FIG. 6 and FIG. 27 is that: in the time period of display (Display), all the third switching transistors T3 need to be controlled to be turned on through the third control signal lines (e.g., MUX21 and MUX22), and all the fourth switching transistors T4 need to be controlled to be on through the fourth control signal lines (e.g., MUX21' and MUX22'), such that the first switching transistors T1 and the third switching transistors T3 electrically connected between the touch pads and the touch signal lines form a passage, and the second switching transistors T2 and the fourth switching transistors T4 electrically connected between the touch pads and the touch signal lines also form a passage, so that the common electrode signals (Vcom) may be loaded to the common electrode blocks com (i.e., touch electrodes 104) to achieve the display function. In the time period of touch (Touch), when the first switching transistors T1 are turned on, the third switching transistors T3 connected with the first switching transistors T1 need to be controlled to be turned on through the third control signal line; when the first switching transistors T1 are turned off, the third switching transistors T3 connected with the first switching transistors T1 need to be controlled to be turned off through the third control signal line; when the second switching transistors T2 are turned on, the fourth switching transistors T4 connected with the second switching transistors T2 need to be controlled to be turned on through the fourth control signal line; and when the second switching transistors T2 are turned off, the fourth switching transistors T4 connected with the second switching transistors T2 need to be controlled to be turned off through the fourth control signal line, so that a time-division touch function is achieved. The working manner of the first switching transistors T1 and the second switching transistors T2 in FIGS. 23 and 30 is the same as that of the first switching transistors T1 and the second switching transistors T2 in FIGS. 6 and 27, and will not be repeated.

Based on the same inventive concept, an embodiment of the present disclosure further provides a driving method of a display substrate, including: during a time period of touch, loading, by each selection circuit, touch signals to electrically connected touch signal lines in a time division mode through a touch pad; and loading, by each load compensation circuit, compensation signals to other touch signal lines while the selection circuit loads the touch signals to one of the touch signal lines.

According to the driving method of the display substrate provided by the embodiment of the present disclosure, when the touch pad loads the touch signals to one of the touch signal lines electrically connected with the touch pad, the load compensation circuit loads compensation signals to other touch signal lines electrically connected with the touch pad and without the loaded touch signals, and then a parasitic capacitance generated between touch electrodes with the loaded touch signals and touch electrodes without the loaded touch signals cannot affect the loading of the touch signals, so that the touch electrodes are fully charged.

Further, during specific implementation, in the driving method of the display substrate provided by the embodiment of the present disclosure, the time period of touch is divided into two time periods. In the first time period, each selection circuit loads the touch signals to the electrically connected first touch signal line through the corresponding touch pad, and each load compensation circuit loads the compensation signals to the electrically connected second touch signal line. In the second time period, each selection circuit loads the touch signals to the electrically connected second touch signal line through the corresponding touch pad, and each load compensation circuit loads the compensation signals to the electrically connected first touch signal line.

Further, during specific implementation, in the driving method of the display substrate provided by the embodiment of the present disclosure, the time period of touch is divided into three time periods. In the first time period, each selection circuit loads the touch signals to the electrically connected first touch signal line through the corresponding touch pad, and each load compensation circuit loads the compensation signals to the electrically connected second and third touch signal lines. In the second time period, each selection circuit loads the touch signals to the electrically connected second touch signal line through the corresponding touch pad, and each load compensation circuit loads the compensation signals to the electrically connected first and third touch signal lines. In the third time period, each selection circuit loads the touch signals to the electrically connected third touch signal line through the corresponding touch pad, and each load compensation circuit loads the compensation signals to the electrically connected first and second touch signal lines.

During specific implementation, the working principle of the driving method of the display substrate can refer to the working principle described in the display substrate, and will not be repeated here.

Based on the same inventive concept, an embodiment of the present disclosure further provides a display device, including the display substrate provided by the embodiment of the present disclosure. Since the principle of solving the problem of the display device is similar to that of the display substrate, the implementation of the display device provided by the embodiment of the present disclosure can refer to the implementation of the display substrate provided by the embodiment of the present disclosure, and will not be repeated.

Figure 35:
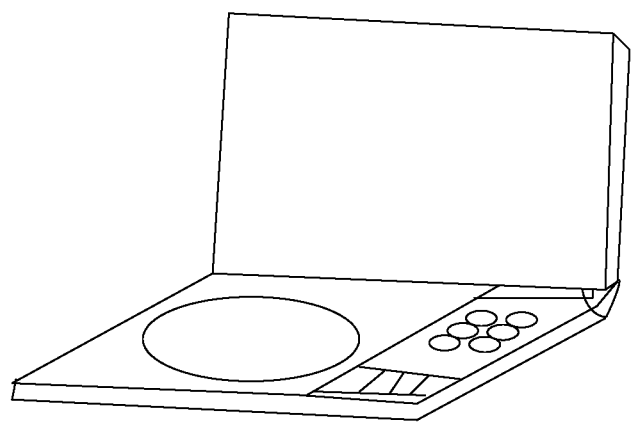
FIG. 35 is a schematic diagram of the structure of a display device provided by an embodiment of the present disclosure.
Figure 36:
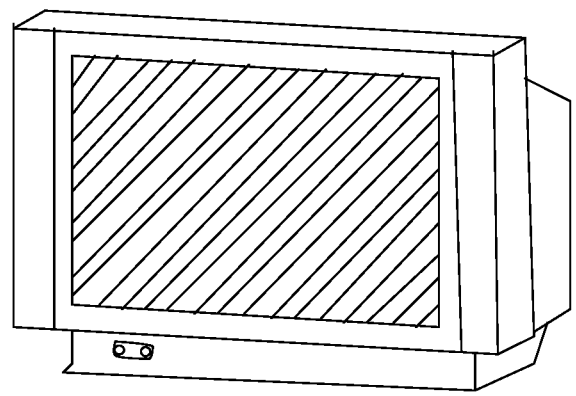
FIG. 36 is a schematic diagram of another structure of a display device provided by an embodiment of the present disclosure.

In some embodiments, the display device provided by the embodiment of the present disclosure may be any product or component with a display function such as a notebook computer (as shown in FIG. 35), a television (as shown in FIG. 36), a mobile phone, a tablet computer, a display, a digital photo frame, a navigator, a smart watch, a fitness wristband, and a personal digital assistant. The display device includes but is not limited to: a radio frequency unit, a network module, an audio output & input unit, a sensor, a display unit, a user input unit, an interface unit, a memory, a processor, a power supply and other components. In addition, those skilled in the art can understand that the above structure does not constitute a limitation of the display device provided by the embodiment of the present disclosure. In other words, the display device provided by the embodiment of the present disclosure may include more or less components, or combine some components, or different component arrangements.

Obviously, those skilled in the art can make various modifications and variations to the present disclosure without departing from the spirit and scope of the present disclosure. In this way, if these modifications and variations of the present disclosure fall within the scope of the claims of the present disclosure and equivalent technologies thereof, the present disclosure is also intended to include these modifications and variations.

What is claimed is:

1. A display substrate, comprising:
    a base substrate, comprising a display area and a non-display area on at least one side of the display area;
    a plurality of touch signal lines in the display area; and
    a touch signal multiplexer, a compensator and a plurality of touch pads in the non-display area; wherein the touch signal multiplexer comprises a plurality of groups of touch selection circuits, the compensator comprises a plurality of groups of load compensation circuits, and the plurality of groups of load compensation circuits are connected with the plurality of groups of touch selection circuits respectively; at least one group of touch selection circuits comprises one touch input and at least two touch outputs, the one touch input is electrically connected with one touch pad, and one of the at least two touch outputs is electrically connected with at least one of the touch signal lines; and one group of load compensation circuits and one group of touch selection circuits connected with each other are electrically connected with same touch signal lines, and are arranged side by side in a first direction perpendicular to a second direction in which the touch signal lines extend.

2. The display substrate according to claim 1, further comprising at least two first control signal lines in the non-display area; wherein each group of touch selection circuits comprises: at least two groups of first switching transistors, one group of first switching transistors is electrically connected with at least one of the touch signal lines, gates of the respective groups of first switching transistors are electrically connected with the respective first control signal lines, first terminals of the respective groups of first switching transistors are electrically connected with the respective touch signal lines, and second terminals of all the groups of first switching transistors are electrically connected with one same touch pad.

3. The display substrate according to claim 2, further comprising at least two second control signal lines and a compensation signal line in the non-display area; wherein each of the load compensation circuits comprises: at least two groups of second switching transistors, one group of second switching transistors is electrically connected with at least one of the touch signal lines, gates of the respective groups of second switching transistors are electrically connected with the respective second control signal lines, first terminals of the respective groups of second switching transistors are electrically connected with the respective touch signal lines, and second terminals of all the groups of second switching transistors are electrically connected with the compensation signal line.

4. The display substrate according to claim 3, wherein one or more first switching transistors in the group of first switching transistors and one or more second switching transistors in the group of second switching transistors electrically connected with one same touch signal line are configured that, within a same time duration, in a condition that the one or more first switching transistors are turned on, the one or more second switching transistors are turned off, and in a condition that the one or more first switching transistors are turned off, the one or more second switching transistors are turned on.

5. The display substrate according to claim 3, wherein the second terminals of all the second switching transistors are electrically connected with one same compensation signal line.

6. The display substrate according to claim 3, wherein the at least two first control signal lines, the at least two second control signal lines and the compensation signal line all extend in the first direction; and the at least two first control signal lines, the at least two second control signal lines and the compensation signal line are between the plurality of groups of touch selection circuits and the plurality of touch pads; or the at least two first control signal lines, the at least two second control signal lines and the compensation signal line are between the plurality of groups of touch selection circuits and the display area.

7. The display substrate according to claim 6, wherein the at least two second control signal lines are between the at least two first control signal lines and the compensation signal line, and the compensation signal line is adjacent to the plurality of groups of touch selection circuits.

8. The display substrate according to claim 3, wherein the at least two first control signal lines, the at least two second control signal lines and the compensation signal line all extend in the first direction; and the at least two first control signal lines are on a side, along the first direction, of the plurality of groups of touch selection circuits, and the at least two second control signal lines and the compensation signal line are on other side, along the first direction, of the plurality of groups of touch selection circuits.

9. The display substrate according to claim 3, further comprising at least two third control signal lines in the non-display area; wherein each group of touch selection circuits further comprises: at least two groups of third switching transistors, and gates of the respective groups of third switching transistors are electrically connected with the respective third control signal lines; and the respective groups of third switching transistors and the respective groups of first switching transistors are arranged in one-to-one correspondence, first terminals of one or more third switching transistors in the group of third switching transistor are electrically connected with the second terminals of the corresponding first switching transistors, and second terminals of the one or more third switching transistors in the group of third switching transistor are electrically connected with the first terminals of the corresponding first switching transistors.

10. The display substrate according to claim 9, wherein one group of third switching transistors and the corresponding group of first switching transistor are sequentially arranged in the second direction.

11. The display substrate according to claim 9, further comprising at least two fourth control signal lines in the non-display area; wherein each group of load compensation circuits further comprises: at least two groups of fourth switching transistors, and gates of the respective groups of fourth switching transistors are electrically connected with the respective fourth control signal lines; and the respective groups of fourth switching transistors and the respective groups of second switching transistors are arranged in one-to-one correspondence, first terminals of one or more fourth switching transistors in the group of fourth switching transistor are electrically connected with the second terminals of the corresponding second switching transistors, and second terminals of the one or more fourth switching transistors in the group of fourth switching transistor are electrically connected with the first terminals of the corresponding second switching transistors.

12. The display substrate according to claim 11, wherein one group of fourth switching transistors and the corresponding group of second switching transistor are sequentially arranged in the second direction.

13. The display substrate according to claim 11, wherein in the first direction, the first switching transistors and the second switching transistors are arranged side by side, and the third switching transistors and the fourth switching transistors are arranged side by side.

14. The display substrate according to claim 11, wherein the at least two first control signal lines, the at least two second control signal lines, the at least two third control signal lines, the at least two fourth control signal lines and the compensation signal line all extend in the first direction;

the at least two first control signal lines, the at least two second control signal lines and the compensation signal line are on a side, along the first direction, of the plurality of groups of touch selection circuits; and the at least two third control signal lines and the at least two fourth control signal lines are on other side, along the first direction, of the plurality of groups of touch selection circuits.

15. The display substrate according to claim 1, further comprising a plurality of touch electrodes in the display area, wherein the plurality of touch electrodes are electrically connected with the plurality of touch signal lines; and touch electrodes electrically connected each group of touch selection circuits through the touch signal lines are in a same row or a same column.

16. The display substrate according to claim 15, further comprising a plurality of common electrode blocks in the display area, wherein the common electrode blocks are multiplexed as the touch electrodes.

17. The display substrate according to claim 1, further comprising a plurality of data signal lines in the display area, and a plurality of groups of data selection circuits and a plurality of data pads in the non-display area; wherein
a third direction in which the data signal lines extend is parallel to the second direction; and
each group of data selection circuits comprises one data input and at least two data outputs, the one data input is electrically connected with one data pad, and one of the at least two data outputs is electrically connected with at least one of the data signal lines.

18. The display substrate according to claim 17, further comprising at least two fifth control signal lines in the non-display area; wherein each group of data selection circuits comprises: at least two groups of fifth switching transistors, one group of fifth switching transistors is electrically connected with at least one of the data signal lines, gates of the respective groups of fifth switching transistors are electrically connected with the respective fifth control signal lines, first terminals of the respective groups of fifth switching transistors are electrically connected with the respective data signal lines, and second terminals of all the groups of fifth switching transistors are electrically connected with one same data pad.

19. The display substrate according to claim 18, wherein the at least two fifth control signal lines extend in the first direction, and the at least two fifth control signal lines are between the plurality of groups of data selection circuits and the plurality of groups of touch selection circuits.

20. The display substrate according to claim 18, further comprising a plurality of connection lines in the non-display area, wherein the data input is electrically connected with the corresponding data pad through a connection line of the plurality of connection lines.

21. The display substrate according to claim 20, wherein in the load compensation circuits and the touch selection circuits connected with each other, the touch selection circuits comprise internal gaps, and the load compensation circuits are on two sides, along the second direction, of the touch selection circuits; and
every three of the connection lines are one group, and one group of connection lines penetrates through one of the internal gaps.

22. The display substrate according to claim 17, further comprising a first driving chip and a second driving chip in the non-display area, wherein a first part of the plurality of touch pads serially arranged in the first direction are electrically connected with the first driving chip, a second part of the plurality of touch pads serially arranged in the first direction are electrically connected with the second driving chip, a first part of the plurality of data pads serially arranged in the first direction are electrically connected with the first driving chip, and a second part of the plurality of data pads serially arranged in the first direction are electrically connected with the second driving chip.

23. A display device, comprising the display substrate according to claim 1.

\* \* \* \* \*